US012706056B2

(12) United States Patent
Huang et al.

(10) Patent No.: US 12,706,056 B2
(45) Date of Patent: Aug. 11, 2026

(54) SCANNING DRIVE CIRCUIT, DISPLAY, AND ELECTRONIC DEVICE

(71) Applicant: Huawei Technologies Co., Ltd., Shenzhen (CN)

(72) Inventors: Qiangcan Huang, Dongguan (CN); Keitaro Yamashita, Osaka (JP); Wei Bai, Dongguan (CN); Xiuling Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/301,303

(22) Filed: Aug. 15, 2025

(65) Prior Publication Data

US 2025/0378792 A1 Dec. 11, 2025

Related U.S. Application Data

(63) Continuation of application No. PCT/CN2024/074940, filed on Jan. 31, 2024.

(30) Foreign Application Priority Data

Feb. 17, 2023 (CN) ......................... 202310154196.9

(51) Int. Cl.
*G09G 3/32* (2016.01)
*G09G 3/3266* (2016.01)

(52) U.S. Cl.
CPC ............. *G09G 3/3266* (2013.01); *G09G 3/32* (2013.01); *G09G 2300/0814* (2013.01);
(Continued)

(58) Field of Classification Search
CPC ... G09G 3/32–3291; G09G 2300/0814; G09G 2310/0243; G09G 2310/0245;
(Continued)

(56) References Cited

U.S. PATENT DOCUMENTS

2018/0075808 A1* 3/2018 Yamashita ........... G09G 3/3266
2018/0144688 A1* 5/2018 Lee ...................... G09G 3/3266
(Continued)

FOREIGN PATENT DOCUMENTS

CN 109697966 A 4/2019
CN 115206245 A 10/2022
(Continued)

*Primary Examiner* — Nathan Danielsen
(74) *Attorney, Agent, or Firm* — Conley Rose, P.C.

(57) ABSTRACT

A scanning drive circuit includes a plurality of stages of first scanning units, a plurality of stages of second scanning units and a first selection circuit, where each stage of first scanning unit includes an output end, each stage of second scanning unit includes an input end and an output end. The first selection circuit includes a first input end, a second input end, and an output end, where the first input end is connected to an output end of any stage of first scanning unit, the second input end is connected to an output end of an $(m-1)^{th}$ stage of second scanning unit, and the output end is connected to an input end of an $m^{th}$ stage of second scanning unit.

20 Claims, 29 Drawing Sheets

(52) U.S. Cl.
CPC ............... *G09G 2310/0245* (2013.01); *G09G 2310/0267* (2013.01); *G09G 2310/04* (2013.01); *G09G 2310/08* (2013.01); *G09G 2320/0247* (2013.01); *G09G 2330/021* (2013.01)

(58) Field of Classification Search
CPC ... G09G 2310/0267; G09G 2310/0281; G09G 2310/0286; G09G 2310/04; G09G 2310/06; G09G 2310/08; G09G 2320/0233; G09G 2320/0247–0257; G09G 2320/10; G09G 2330/021–023
See application file for complete search history.

(56) References Cited

U.S. PATENT DOCUMENTS

| | | | | |
|---|---|---|---|---|
| 2018/0197480 | A1* | 7/2018 | Choi .................... | G09G 3/3275 |
| 2021/0350733 | A1* | 11/2021 | Liu ...................... | G09G 3/3266 |
| 2022/0139312 | A1* | 5/2022 | Bai ...................... | G09G 3/3266<br>345/204 |
| 2022/0139324 | A1 | 5/2022 | Jeong et al. | |
| 2022/0157250 | A1 | 5/2022 | Kim et al. | |
| 2022/0309972 | A1* | 9/2022 | Yang .................... | G09G 3/3266 |

FOREIGN PATENT DOCUMENTS

| | | | |
|---|---|---|---|
| CN | 115273753 | A | 11/2022 |
| KR | 20150066981 | A | 6/2015 |
| KR | 20220105886 | A | 7/2022 |

* cited by examiner

SCANNING DRIVE CIRCUIT, DISPLAY, AND ELECTRONIC DEVICE

CROSS-REFERENCE TO RELATED APPLICATIONS

This is a continuation of International Patent Application No. PCT/CN2024/074940, filed on Jan. 31, 2024, which claims priority to Chinese Patent Application No. 202310154196.9, filed on Feb. 17, 2023, both of which are incorporated by reference.

TECHNICAL FIELD

This disclosure relates to the field of drive display technologies, and in particular, to a scanning drive circuit, a display, and an electronic device.

BACKGROUND

On a video or game interface, different pictures are displayed in a display area at different moments. For example, a dynamic picture is displayed in the display area at some moments, and a static picture is displayed in the display area at some moments. To reduce power consumption as much as possible, a display is refreshed at a high refresh rate when the dynamic picture is displayed, and the display is refreshed at a low refresh rate when the static picture is displayed.

However, on the video or game interface, in the entire display area, there is a case in which the static picture is displayed in some sub-areas and the dynamic picture is displayed in some sub-areas. When the entire display area including the sub-areas in which the dynamic picture is displayed and the sub-areas in which the static picture is displayed is refreshed at a same and high refresh rate, a problem of high-power consumption still exists.

SUMMARY

To resolve the foregoing technical problem, this disclosure provides a scanning drive circuit, a display, and an electronic device. This disclosure can be applied to a case in which a display area includes a dynamic picture and a static picture. In addition, a high refresh rate can be implemented on the dynamic picture in the display area, to improve user experience, and a low refresh rate can be implemented on the static picture in the display area, to reduce power consumption.

This disclosure provides a scanning drive circuit, and the drive circuit may be applied to a display. The drive circuit may include: M stages of first scanning units, or scanners, that are sequentially connected, M stages of second scanning units that are sequentially connected, and a first selection circuit, where M is an integer greater than 1. Each stage of first scanning unit includes an input end and an output end. Except a first stage of first scanning unit, an output end of another stage of first scanning unit is connected to an input end of a next stage of first scanning unit. In this way, a first selection signal output by each stage of first scanning unit may be used as an input signal of a next stage of first scanning unit. Each stage of second scanning unit includes an input end and an output end. The first selection circuit includes a first input end, a second input end, and an output end. The first input end is connected to an output end of any stage of first scanning unit, the second input end is connected to an output end of an $(m-1)^{th}$ stage of second scanning unit, and the output end of the first selection circuit is connected to an input end of an $m^{th}$ stage of second scanning unit.

A quantity of the first selection circuits may be N, where N is an integer greater than or equal to 1. In other words, N is one or more. When there is one first selection circuit, except a first stage of second scanning unit and the $(m-1)^{th}$ stage of second scanning unit, an output end of another stage of second scanning unit is connected to an input end of a next stage of second scanning unit. In this way, except the $(m-1)^{th}$ stage of second scanning unit, a second selection signal output by each stage of second scanning unit may be used as an input signal of a next stage of second scanning unit.

The first selection circuit is configured to: receive a first selection signal transmitted by any stage of first scanning unit, receive a second selection signal transmitted by the $(m-1)^{th}$ stage of second scanning unit, and transmit the first selection signal or the second selection signal to the $m^{th}$ stage of second scanning unit, or no signal is transmitted between the first selection circuit and the $m^{th}$ stage of second scanning unit. In this way, after receiving the first selection signal and the second selection signal, the first selection circuit may selectively output the first selection signal or the second selection signal, or does not send a selection signal. In this case, the $m^{th}$ stage of second scanning unit may receive the first selection signal or the second selection signal that is sent by the first selection circuit, or receive no selection signal. It may be understood that, the display usually further includes a plurality of rows of pixel circuits, and each row of pixel circuit may be correspondingly connected to each stage of first scanning unit and each stage of second scanning unit. In other words, a first scanning unit and a second scanning unit that are located at a same stage may drive a row of pixel circuit corresponding to the stage. In a process in which the display is refreshed, scanning and refreshing are usually performed row by row. For example, a first stage of first scanning unit and a first stage of second scanning unit may drive a first row of pixel circuit, a second stage of first scanning unit and a second stage of second scanning unit may drive a second row of pixel circuit, and the rest may be deduced by analogy. When the pixel circuit is scanned, scanning is performed row by row from a first row to a last row.

The display area may be divided into two different areas (a first sub-area and a second sub-area) based on a location of the first selection circuit, and a frequency of the first selection signal and a frequency of the second selection signal are set to different frequencies. When the first sub-area and the second sub-area need to be refreshed at a first moment, the first selection circuit may choose to output the second selection signal to the $m^{th}$ stage of second scanning unit, and the $m^{th}$ stage of second scanning unit also outputs the second selection signal. In this case, both the first sub-area and the second sub-area are refreshed. At a second moment, when the first sub-area does not need to be refreshed but the second sub-area needs to be refreshed, the frequency of the first selection signal may be set to be higher than the frequency of the second selection signal. The $(m-1)^{th}$ stage of second scanning unit does not output the second selection signal, and the first selection circuit may choose to output the first selection signal to the $m^{th}$ stage of second scanning unit. In this case, the second sub-area may be refreshed. At a third moment, when the first sub-area needs to be refreshed but the second sub-area does not need to be refreshed, the first selection circuit may not output the first selection signal and the second selection signal. In this case, the $m^{th}$ stage of second scanning unit cannot receive an input signal, and the second sub-area is not refreshed. Therefore, different refresh rates can be implemented for different sub-areas. When the display in this disclosure is applied to a game scenario, a high refresh rate can be implemented on the dynamic picture in the display area, to improve user experience, and a low refresh rate can be implemented on the static picture in the display area, to reduce power consumption.

When there are N first selection circuits, in a possible implementation, M−N=1. In this implementation, the first input ends of the N first selection circuits are respectively correspondingly connected to a first stage of second scanning unit to an $(M-1)^{th}$ stage of second scanning unit, the second input ends of the N first selection circuits are further respectively correspondingly connected to the first stage of second scanning unit to the $(M-1)^{th}$ stage of second scanning unit, and output ends of the N first selection circuits are further respectively correspondingly connected to a second stage of second scanning unit to an $M^{th}$ stage of second scanning unit. In other words, except the first stage of second scanning unit, an input end of another stage of second scanning unit is connected to an output end of a previous stage of second scanning unit and an output end of a previous stage of first scanning unit through the first selection circuit. It may be understood that, when the first selection circuit outputs the second selection signal transmitted by the $(m-1)^{th}$ stage of second scanning unit, an $(m-1)^{th}$ row of pixel circuit corresponding to the $(m-1)^{th}$ stage of second scanning unit is synchronized with an $m^{th}$ row of pixel circuit corresponding to the $m^{th}$ stage of second scanning unit. In other words, the $(m-1)^{th}$ row of pixel circuit and the $m^{th}$ row of pixel circuit are synchronously refreshed or synchronously not refreshed, and the $(m-1)^{th}$ row of pixel circuit and the $m^{th}$ row of pixel circuit may be grouped into a same area. Therefore, in this implementation, a quantity of sub-areas that can be obtained by dividing a display area is less than M. In addition, when the quantity of the first selection circuits is N, the display area may be divided into a maximum of N+1 sub-areas. Because M−N=1, N+1 is M. In other words, in this implementation, the display may be divided into a maximum of M sub-areas. In this case, the display may be divided into 2 to M sub-areas. Based on a same principle as that when there is one first selection circuit, when the display is divided into N+1 sub-areas, different refresh rates of the N+1 sub-areas may also be implemented. In this way, more areas can be obtained.

On a game interface, sizes of a static picture and a dynamic picture may be different at different moments. Based on this, a quantity of sub-areas obtained by dividing the display area and a quantity of rows of pixel circuits included in each sub-area are also different. Therefore, this implementation is better applicable to the game scenario, so that a high refresh rate can be implemented on a dynamic area to improve user experience, and a low refresh rate can be implemented on a static area to reduce power consumption.

In addition, in some other possible implementations, M−N>1. The first input ends of the N first selection circuits are respectively correspondingly connected to N stages of first scanning units, the second input ends of the N first selection circuits are further respectively correspondingly connected to N stages of second scanning units, and output ends of the N first selection circuits are further respectively correspondingly connected to the N stages of second scanning units. In this way, when the quantity of the first selection circuits is N, a maximum quantity of sub-areas into which the display area may be divided may be N+1. In other words, the display area may be divided into N+1 sub-areas, or the display area may be divided into N sub-areas. For example, when there are two first selection circuits, the display may be divided into a maximum of two sub-areas or three sub-areas. Based on a same principle as that when there is one first selection circuit, when the display is divided into N+1 sub-areas, different refresh rates of the N+1 sub-areas may also be implemented. In this way, more areas can be obtained, to be better applicable to a scenario in which a game interface is refreshed.

In addition, in some other possible implementations, M=N. In other words, quantities of the first scanning units, the second scanning units, and the first selection circuits are the same. A first input end of one of the first selection circuits is connected to an output end of the first stage of first scanning unit, a second input end is connected to a first column start signal input end, and an output end is connected to an input end of the first stage of second scanning unit. Except the first stage of second scanning unit, an input end of another stage of second scanning unit is connected to an output end of a previous stage of second scanning unit and an output end of a previous stage of first scanning unit through the first selection circuit. In this case, the first selection circuit connected to the first stage of first scanning unit may choose to output, to the second stage of second scanning unit, the first selection signal transmitted by the first stage of first scanning unit or a first column start signal transmitted by the first column start signal input end.

In some possible implementations, the first selection circuit includes a first switching transistor, a second switching transistor, a first drive signal input end, and a second drive signal input end, a second electrode of the first switching transistor is used as the second input end and is connected to the output end of the $(m-1)^{th}$ stage of second scanning unit, a first electrode of the second switching transistor is used as the first input end and is connected to the output end of any stage of first scanning unit, a second electrode of the second switching transistor is connected to a first electrode of the first switching transistor and is used as the output end of the first selection circuit and is connected to the input end of the $m^{th}$ stage of second scanning unit, a control electrode of the first switching transistor is connected to the first drive signal input end, and a control electrode of the second switching transistor is connected to the second drive signal input end. In this implementation, both the first switching transistor and the second switching transistor may be P-type transistors. When a low-level signal is transmitted to the control electrode of the first switching transistor, and a high-level signal is transmitted to the second switching transistor, the first switching transistor is conducted, and the second switching transistor is cut off. Because the second electrode of the first switching transistor is connected to the output end of the $(m-1)^{th}$ stage of second scanning unit, the second selection signal transmitted by the second scanning unit may be transmitted to the $m^{th}$ stage of second scanning unit through the first switching transistor. When a high-level signal is transmitted to the control electrode of the first switching transistor, and a high-level signal is transmitted to the second switching transistor, the first switching transistor is cut off, and the second switching transistor is conducted. Because the first electrode of the second switching transistor is connected to the output end of any stage of first scanning unit, the first selection signal transmitted by the first scanning unit may be transmitted to the $m^{th}$ stage of second scanning unit through the second switching transistor. When a high-level signal is transmitted to both the control electrode of the first switching transistor and the control electrode of the second switching transistor, both the first switching transistor and the second switching transistor are cut off, no signal is transmitted between the first selection circuit and the $m^{th}$ stage of second scanning unit, and the $m^{th}$ stage of second scanning unit does not output the second selection signal. In this way, the control electrode of the first switching transistor and the second switching transistor are controlled to transmit different level signals, so that the first switching transistor and the second switching transistor can be conducted or cut off, and the first selection circuit outputs the first selection signal or the second selection signal, or outputs no signal.

In another implementation, both the first switching transistor and the second switching transistor may be N-type transistors; or the first switching transistor is a P-type transistor, and the second switching transistor is an N-type transistor; or the first switching transistor is an N-type transistor, and the second switching transistor is a P-type transistor.

In addition, in addition to the foregoing technical solutions, the first selection circuit may further use a signal selector. The signal selector may receive the first selection signal transmitted by the first scanning unit, and receive the second selection signal transmitted by the $(m-1)^{th}$ stage of second scanning unit, and output the first selection signal, or output the second selection signal, or output no signal.

In some possible implementations, the first input end of the first selection circuit is connected to the output end of an $m^{th}$ stage of first scanning unit. Because a scanning manner of the pixel circuit is row-by-row scanning, when the $m^{th}$ row of pixel circuit is scanned, the first selection signal output by the output end of the $m^{th}$ stage of first scanning unit is a high-level signal, and the first selection signal output by the output end of another stage of first scanning unit is a low-level signal. Therefore, when the $m^{th}$ stage of first scanning unit transmits the first selection signal to the first selection circuit, and the first selection circuit sends the first selection signal to the $m^{th}$ stage of second scanning unit, the $m^{th}$ stage of second scanning unit may receive the first selection signal that is a high-level signal. Therefore, the second selection signal output by the $m^{th}$ stage of second scanning unit is also a high-level signal. In this way, the $m^{th}$ row of pixel circuit may be driven.

In addition, in some other possible implementations, the first input end of the first selection circuit is connected to an output end of an $(m-r)^{th}$ stage or an $(m+r)^{th}$ stage of first scanning unit, where $r \leq 5$. For example, the first input end of the first selection circuit is connected to an output end of an $(m-1)^{th}$ stage of first scanning unit, or the first input end of the first selection circuit is connected to an output end of an $(m+1)^{th}$ stage of first scanning unit. During actual application, first selection signals output by two adjacent stages of first scanning units overlap. For example, when an $(m-1)^{th}$ row of pixel circuit is scanned, the $(m-1)^{th}$ stage of first scanning unit outputs a high-level signal, and the $m^{th}$ stage of first scanning unit outputs a low-level signal. When the $m^{th}$ row of pixel circuit is scanned, the $m^{th}$ stage of first scanning unit outputs a high-level signal, and the $(m-1)^{th}$ stage of first scanning unit also outputs a high-level signal. In this case, the first selection signal output by the $m^{th}$ stage of first scanning unit overlaps the first selection signal output by the $(m+1)^{th}$ stage of first scanning unit. When the $m^{th}$ row of pixel circuit is scanned, the first input end of the first selection circuit is connected to the output end of the $(m-1)^{th}$ stage of first scanning unit. Because the $(m-1)^{th}$ stage of first scanning unit outputs the high-level signal, the first selection circuit receives the high-level signal transmitted by the first scanning unit and sends the high-level signal to the $m^{th}$ stage of second scanning unit. Therefore, the $m^{th}$ stage of second scanning unit may also output the high-level signal, to drive the $m^{th}$ row of pixel circuit.

When $M-N>1$, that is, a difference between a quantity of second scanning units and the quantity of first selection circuits is greater than 1, in the plurality of stages of second scanning units, input ends of some second scanning units are connected to the first selection circuit, and input ends of other second scanning units are not connected to the first selection circuit. For example, the input end of the $m^{th}$ stage of second scanning unit is connected to the first selection circuit, but an output end of the $m^{th}$ stage of second scanning unit is not connected to the first selection circuit. In other words, the first selection circuit is not connected between the output end of the $m^{th}$ stage of second scanning unit and an input end of the $(m+1)^{th}$ stage of second scanning unit. Therefore, a pulse voltage of the second selection signal output by the output end of the $m^{th}$ stage of second scanning unit is lower than a pulse voltage of the second selection signal output by the $(m+1)^{th}$ stage of second scanning unit. This causes a delay of the second selection signal output by the $(m+1)^{th}$ stage of second scanning unit to be different from a delay of the second selection signal output by the $m^{th}$ stage of second scanning unit, and consequently causes a linear mura (mura) defect, that is, a stain or color difference on the display. Based on this, in this implementation, the scanning drive circuit may further include a third switching transistor and a third drive signal input end. A first electrode of the third switching transistor is connected to the output end of the $m^{th}$ stage of second scanning unit, the output end of the $m^{th}$ stage of second scanning unit is not connected to the first selection circuit, a second electrode of the third switching transistor is connected to the input end of the $(m+1)^{th}$ stage of second scanning unit, and a control electrode of the third switching transistor is connected to the third drive signal input end. When the third switching transistor is connected between the output end of the $m^{th}$ stage of second scanning unit and the input end of the $(m+1)^{th}$ stage of second scanning unit, pulse voltages of the second selection signals output by the $m^{th}$ stage of second scanning unit and the $(m+1)^{th}$ stage of second scanning unit may be as same as possible, to reduce occurrence of a linear mura defect.

The scanning drive circuit includes K third switching transistors, where K is an integer greater than or equal to 1. In other words, K is one or more. When K is greater than 1, a difference between M and K+N is 1, and an output end of each of the first stage of second scanning unit to the $(M-1)^{th}$ stage of second scanning unit is connected to the third switching transistor or the first selection circuit. In other words, the third switching transistor or the first selection circuit is connected between the output end of the first stage of second scanning unit and the input end of the second stage of second scanning unit, the third switching transistor or the first selection circuit is connected between the output end of the second stage of second scanning unit and an input end of a third stage of second scanning unit, and the rest may be deduced by analogy. In this way, a pulse voltage of a second selection signal output by an output end of each stage of second scanning unit is the same as a pulse voltage of a second selection signal output by an output end of another stage of second scanning unit, to better reduce occurrence of a linear mura defect.

In some possible implementations, the scanning drive circuit further includes a first column start signal input end, and the input end of the first stage of second scanning unit is connected to the first column start signal input end. In this way, the frequency of the second selection signal output by the output end of the first stage of second scanning unit is the same as the frequency of the first column start signal input by the first column start signal input end.

In addition, in some other possible implementations, the scanning drive circuit further includes a fourth switching transistor and a fourth drive signal input end. A first electrode of the fourth switching transistor is connected to the output end of any stage of first scanning unit, a second electrode of the fourth switching transistor is connected to an input end of the first stage of second scanning unit, and a control electrode of the fourth switching transistor is connected to the fourth drive signal input end. In this way, the frequency of the second selection signal output by the first stage of second scanning unit may be adjusted through conduction and cut-off of the fourth switching transistor, that is, a frequency of a $1^{st}$ sub-area from top to bottom in the display area may be adjusted. In this implementation, the fourth switching transistor may be a P-type transistor or an N-type transistor. Herein, an example in which the fourth switching transistor is a P-type transistor is used. When a low-level signal is transmitted to the control electrode of the fourth switching transistor, the fourth switching transistor is conducted, and the first selection signal output by any stage of first scanning unit may be transmitted to the first stage of second scanning unit through the fourth switching transistor. When the fourth switching transistor is always in a conducted state, the frequency of the second selection signal output by the first stage of second scanning unit is the same as the frequency of the first selection signal output by any stage of first scanning unit. If the frequency of the second selection signal output by the first stage of second scanning unit needs to be lower than the frequency of the first selection signal output by any stage of first scanning unit, when the first selection signal output by any stage of first scanning unit is a high-level signal, the high-level signal may be transmitted to the control electrode of the fourth switching transistor. The fourth switching transistor is cut off, and the first stage of second scanning unit does not output a signal. In this way, it can be implemented that the frequency of the second selection signal output by the first stage of second scanning unit is lower than the frequency of the first selection signal of any stage of first scanning unit, so that the frequency of the second selection signal output by the first stage of second scanning unit is adjusted, and a refresh rate of the $1^{st}$ sub-area of the display area is adjusted.

In addition, in an example, when first selection signals output by two adjacent stages of first scanning units do not overlap, the first electrode of the fourth switching transistor is connected to the output end of the first stage of first scanning unit. When the first row of pixel circuit is scanned, the first selection signal output by the first stage of first scanning unit is a high-level signal. Therefore, when the first electrode of the fourth switching transistor is connected to the output end of the first stage of first scanning unit, and the fourth switching transistor is conducted, the high-level signal output by the first stage of first scanning unit may be transmitted to the first stage of first scanning unit through the fourth switching transistor, and the second selection signal output by the first stage of first scanning unit is also a high-level signal, so that the first row of pixel circuit can be driven.

In another example, when first selection signals output by two adjacent stages of first scanning units overlap, the first electrode of the fourth switching transistor may further be connected to the output end of the second stage of first scanning unit or the third stage of first scanning unit.

When selection signals output by two adjacent stages of first scanning units overlap, and a $2m^{th}$ row of pixel circuit is scanned, because the selection signal output by the $m^{th}$ stage of first scanning unit is also at a high level, the first selection circuit is also connected between the $(m-1)^{th}$ stage of first scanning unit and the $m^{th}$ stage of second scanning unit, and an input signal of the $m^{th}$ stage of second scanning unit is also a high-level signal, the selection signal output by the $m^{th}$ stage of second scanning unit is a high-level signal, the $m^{th}$ row of pixel circuit is also driven. As a result, the scanning drive circuit works abnormally.

Based on this, in a scenario in which first selection signals output by two stages of first scanning units overlap, for example, in a scenario in which first selection signals output by the $(m+1)^{th}$ stage of first scanning unit and a $(2m+1)^{th}$ stage of first scanning unit overlap, the scanning drive circuit further includes a fifth switching transistor. A second electrode of the fifth switching transistor is connected to the first input end, a first electrode of the fifth switching transistor is connected to an output end of a $p^{th}$ stage of first scanning unit, a control electrode of the fifth switching transistor is connected to an output end of a $(p+q)^{th}$ stage of first scanning unit, and both p and q are integers greater than or equal to 1. When the fifth switching transistor is a P-type transistor, and when the $(2m+1)^{th}$ stage of first scanning unit receives the first selection signal transmitted by a $2m^{th}$ stage of first scanning unit, the $(2m+1)^{th}$ stage of first scanning unit sends a high-level signal to the control electrode of the first switching transistor, and sends a low-level signal to the control electrode of the second switching transistor, and the $2m^{th}$ stage of first scanning unit transmits the first selection signal to a $(2m+1)^{th}$ stage of second scanning unit through the first selection circuit. The first selection signal is a high-level signal, and the second selection signal output by the $(2m+1)^{th}$ stage of second scanning unit is also a high-level signal. Because the control electrode of the fifth switching transistor is connected to the output end of the $(p+q)^{th}$ stage of first scanning unit, when first selection signals output by the $p^{th}$ stage of first scanning unit and the $(p+q)^{th}$ stage of first scanning unit are high-level signals, the fifth switching transistor is cut off. Therefore, the high-level signal output by the $p^{th}$ stage of first scanning unit cannot be transmitted to the $m^{th}$ stage of second scanning unit, and no signal is output by the second scanning unit, to reduce a case in which the drive circuit works abnormally.

In addition, $p=m-1$, and $q=1$. In other words, the first electrode of the fifth switching transistor is connected to the output end of the $(m-1)^{th}$ stage of first scanning unit, and the control electrode of the fifth switching transistor is connected to the output end of the $m^{th}$ stage of first scanning unit. Alternatively, $p=m-2$, and $q=2$, 3, 4, or the like. In this way, the fifth switching transistor connected to the input end of the $m^{th}$ stage of second scanning unit is also connected to the $m^{th}$ stage of first scanning unit, so that operating accuracy of the scanning drive circuit can be further improved.

There are one or more fifth switching transistors. When there are a plurality of fifth switching transistors, in some possible implementations, a quantity of the fifth switching transistors is the same as a quantity of the first selection circuits, and a second electrode of each fifth switching transistor is correspondingly connected to the first input end of each first selection circuit. In this way, each first selection circuit is connected to one fifth switching transistor, so that a case in which a circuit works abnormally at a position in which each first selection circuit is located can be reduced, and operating accuracy of the scanning drive circuit is further improved.

In addition, in some other possible implementations, there are a plurality of fifth switching transistors, and a quantity of fifth switching transistors is less than a quantity of first selection circuits.

When the scanning drive circuit is applied to a pixel circuit having more pixel transistors, the scanning drive circuit may further include a plurality of stages of third scanning units that are sequentially connected and a second selection circuit. Each stage of third scanning unit includes a fifth input end and a fifth output end, the second selection circuit includes a sixth input end, a seventh input end, and a sixth output end, the sixth input end is connected to an output end of any stage of second scanning unit, the seventh input end is connected to a fifth output end of an $(m-1)^{th}$ stage of third scanning unit, and the sixth output end is connected to a fifth input end of an $m^{th}$ stage of third scanning unit. In this way, the third scanning drive circuit may also transmit a third selection signal to one or more pixel transistors in the pixel circuit.

When the scanning drive circuit is applied to a 7TIC pixel circuit, the scanning drive circuit may further include a plurality of stages of fourth scanning units that are sequentially connected, a plurality of stages of fifth scanning units that are sequentially connected, and a third selection circuit. Each stage of fourth scanning unit includes an eighth output end, each stage of fifth scanning unit includes a ninth input end and a ninth output end, the third selection circuit includes a tenth input end, an eleventh input end, and a tenth output end, the tenth input end is connected to an eighth output end of any stage of fourth scanning unit, the eleventh input end is connected to a ninth output end of an $(m-1)^{th}$ stage of fifth scanning unit, and the tenth output end is connected to a ninth input end of an $m^{th}$ stage of fifth scanning unit. In this way, the first scanning unit may transmit the first selection signal to two pixel transistors in the pixel circuit, the second scanning unit may transmit the second selection signal to two pixel transistors in the pixel circuit, the fourth scanning unit may transmit a fourth selection signal to one pixel transistor in the pixel circuit, and the fifth scanning unit may transmit a fifth selection signal to one pixel transistor in the pixel circuit. Therefore, the scanning drive circuit in this implementation may be applied to the 7T1C pixel circuit.

This disclosure further provides a display, including a plurality of pixel circuits arranged in an array and the scanning drive circuit according to any one of the foregoing implementations. Each pixel circuit is electrically connected to the scanning drive circuit. For example, an output end of each stage of first scanning unit is correspondingly connected to each row of pixel circuit, and an output end of each stage of second scanning unit is correspondingly connected to each row of pixel circuit. The display can implement all effects of the scanning drive circuit.

In some possible implementations, the scanning drive circuit further includes a third drive signal input end, and the display further includes a displaying drive circuit. The displaying drive circuit is connected to the third drive signal input end, and the displaying drive circuit is configured to send a low-level signal to the third drive signal input end. Because the third drive signal input end is connected to a control electrode of a third switching transistor, when the third switching transistor is a P-type transistor, after the displaying drive circuit sends the low-level signal to the third drive signal input end, the control electrode of the third switching transistor may receive the low-level signal, and the third switching transistor is conducted. The second selection signal may be transmitted, through the third switching transistor, between two stages of second scanning units connected through the third switching transistor. In this way, a pulse voltage of a second selection signal output by an output end of each stage of second scanning unit may be the same as a pulse voltage of a second selection signal output by an output end of another stage of second scanning unit, to better reduce occurrence of a linear mura defect.

In some possible implementations, the displaying drive circuit is further configured to: send a first clock signal to the scanning drive circuit when an output end of a second scanning unit outputs a low-level signal; or send a second clock signal to the scanning drive circuit when an output end of a second scanning unit outputs a high-level signal, where a frequency of the first clock signal is less than a frequency of the second clock signal. When a row of pixel circuit needs to be driven, an output end of a second scanning unit corresponding to the row of pixel circuit outputs a high-level signal. When a row of pixel circuit does not need to be driven, an output end of a second scanning unit corresponding to the row of pixel circuit outputs a low-level signal. In other words, when the second scanning unit outputs a low-level signal, it indicates that a row of pixel circuit corresponding to the second scanning unit does not need to be driven. Because a frequency of a clock signal is usually the same as a row scanning frequency of a pixel circuit, when the second scanning unit outputs a low-level signal, the frequency of the clock signal may be reduced. In other words, a frequency of the first clock signal sent by the displaying drive circuit when the second scanning unit outputs a low-level signal is less than a frequency of the second clock signal sent by the displaying drive circuit when the second scanning unit outputs a high-level signal, so that power consumption is reduced.

In addition, in some other possible implementations, the displaying drive circuit is further configured to send a third clock signal to the scanning drive circuit when the output end of the second scanning unit outputs a low-level signal, where the third clock signal is a direct current signal. It may be understood that when the second scanning unit outputs a low-level signal, it indicates that a row of pixel circuit corresponding to the second scanning unit does not need to be driven. The third clock signal sent by the displaying drive circuit is a direct current signal, and the direct current signal has lower power consumption than a selection signal having a specific frequency. Therefore, power consumption can be further reduced in this solution.

This disclosure further provides an electronic device, including a controller and the display according to any one of the foregoing solutions, where the controller is electrically connected to the display. The electronic device can implement all effects of the foregoing display.

BRIEF DESCRIPTION OF DRAWINGS

To describe the technical solutions in embodiments of this disclosure more clearly, the following briefly introduces the accompanying drawings for describing embodiments of this disclosure. The accompanying drawings in the following description show merely some embodiments of this disclosure, and a person of ordinary skill in the art may still derive other drawings from these accompanying drawings without creative efforts.

DETAILED DESCRIPTION

The following clearly and completely describes the technical solutions in embodiments of this disclosure with reference to the accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

The term "and/or" in this specification describes only an association relationship for associated objects and represents that three relationships may exist. For example, A and/or B may represent the following three cases: Only A exists, both A and B exist, and only B exists.

In the specification and claims in embodiments of this disclosure, the terms "first", "second", and so on are intended to distinguish between different objects but do not indicate a particular order of the objects. For example, a first target object, a second target object, and the like are used for distinguishing between different target objects, but are not used for describing a specific order of the target objects.

In addition, in embodiments of this disclosure, the word "exemplary" or "for example" is used to represent giving an example, an illustration, or a description. Any embodiment or design scheme described as an "example" or "for example" in embodiments of this disclosure should not be explained as being more preferred or having more advantages than another embodiment or design scheme. To be precise, use of the word such as "example" or "for example" is intended to present a relative concept in a specific manner.

In descriptions of embodiments of this disclosure, "a plurality of" means two or more, unless otherwise specified. For example, a plurality of processing units mean two or more processing units, and a plurality of systems mean two or more systems.

Figure 1:
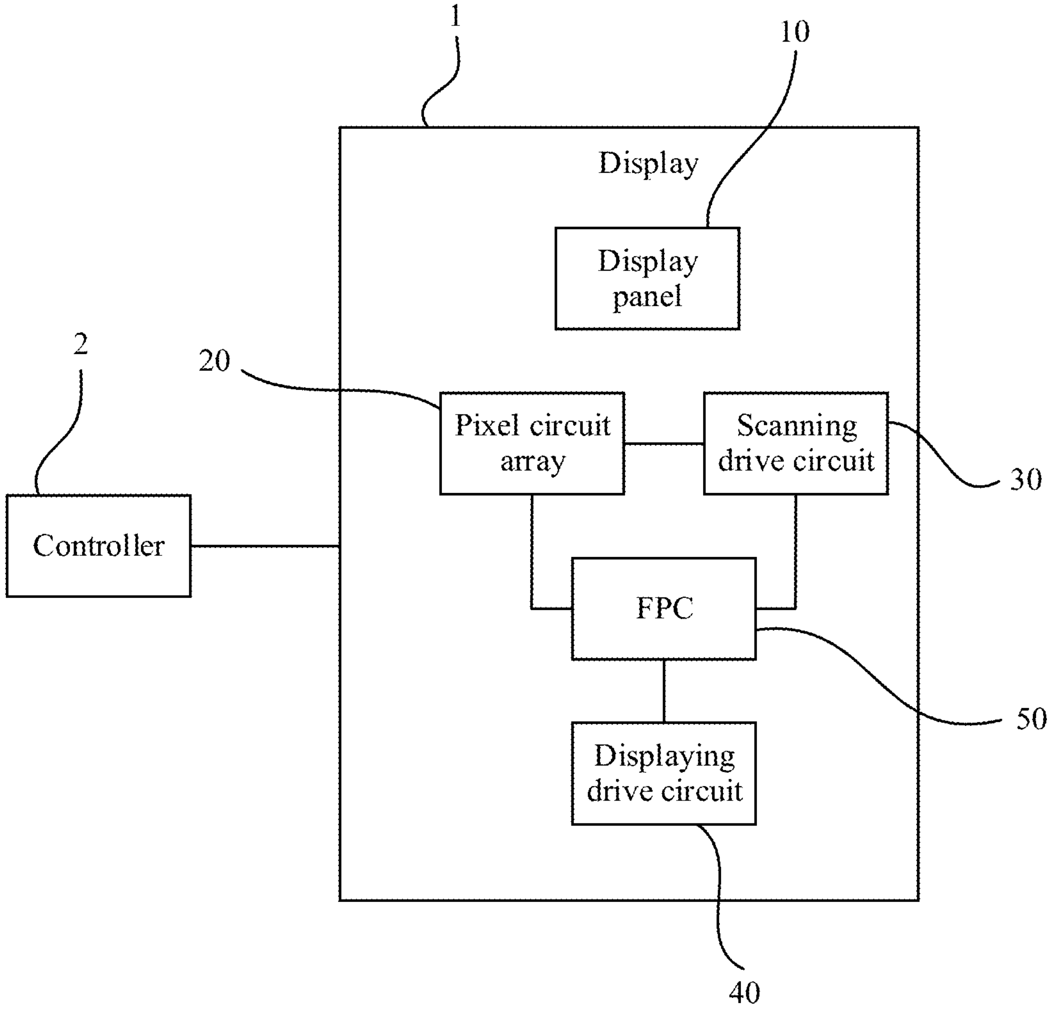
FIG. 1 is a diagram of a structure of an electronic device according to an embodiment of this disclosure.

As shown in FIG. 1, an electronic device like a mobile phone, a tablet computer, a computer, a game console, or a personal digital assistant (PDA) may generally include a display 1 and a controller 2 electrically connected to the display 1. The display 1 may be an organic light-emitting diode (OLED) display. The OLED display is a display made of an organic self-luminescence diode. The OLED display also has a self-luminescence organic electro-luminescence diode, does not need a backlight source, and has a high contrast. The controller 2 is used to transmit video data, a clock signal, signaling, and the like to the display 1. The controller 2 may include but is not limited to various types of processors such as a system on chip (SOC), an application processor (AP), or a general purpose processor.

As shown in FIG. 1, the display 1 includes a display panel 10, a pixel circuit array 20, a scanning drive circuit 30, a displaying drive circuit 40, and a flexible printed circuit (FPC) 50. The pixel circuit array 20, the scanning drive circuit 30, and the displaying drive circuit 40 are all fixed on the FPC 50, and each two are electrically connected through the FPC 50.

The display panel 10 has a display area, and the display area is used to display an image or a video. The display panel 10 covers the pixel circuit array 20. When a light emitting device L included in the pixel circuit array 20 emits light, light may pass through the display panel 10, and a user may see an image on the display panel 10.

Figure 2A:
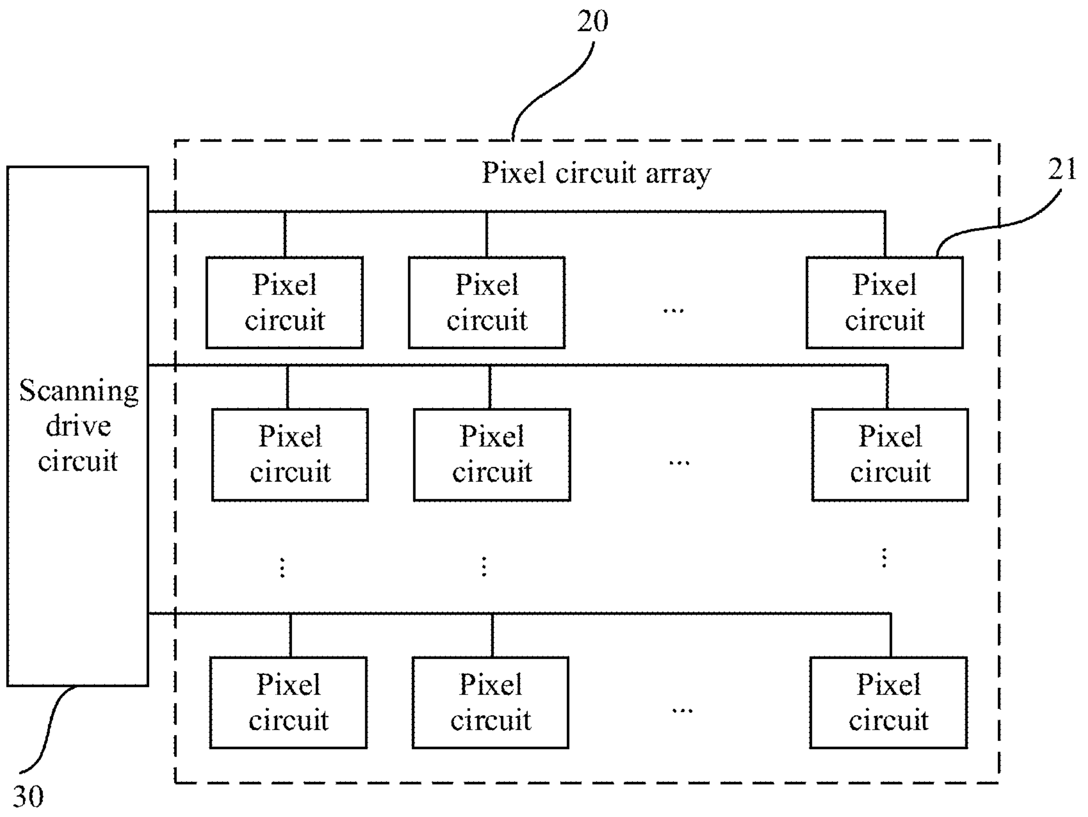
FIG. 2A is a diagram of a connection relationship between a scanning drive circuit and a pixel circuit array in FIG. 1.

As shown in FIG. 2A, the pixel circuit array 20 may include pixel circuits 21 of M×D arrays, where a quantity of rows is M, and a quantity of columns is D. Each pixel circuit 21 is electrically connected to the scanning drive circuit 30.

Figure 2B:
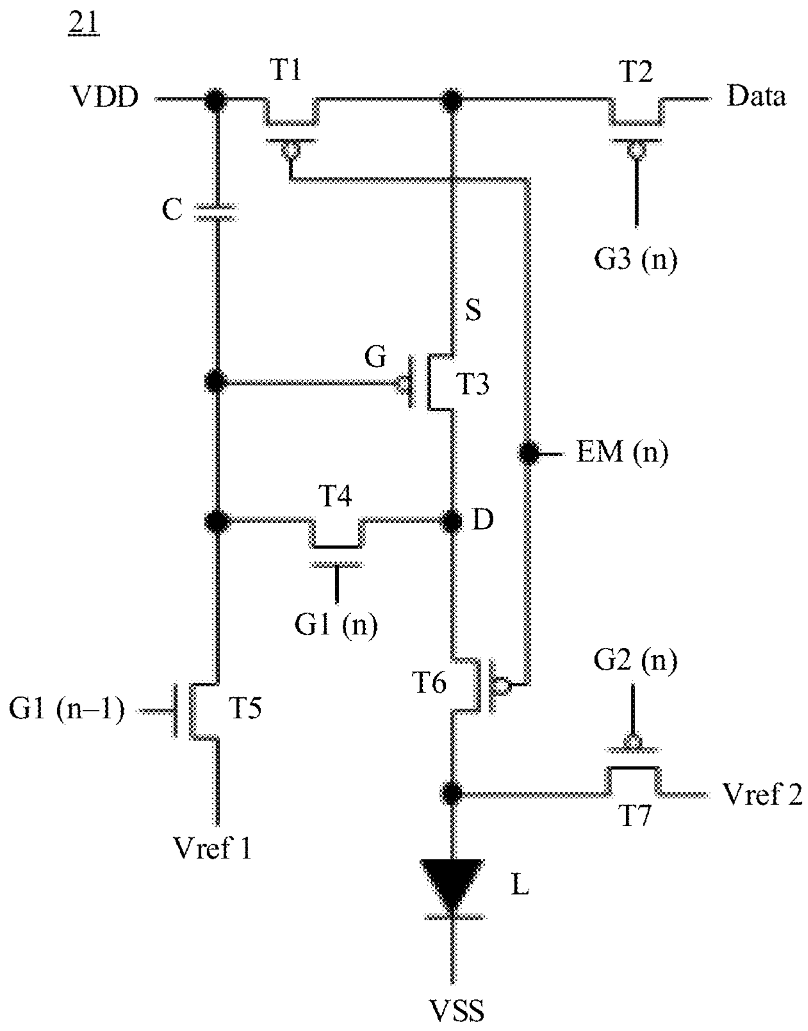
FIG. 2B is a circuit diagram of a pixel circuit in FIG. 2A.

The pixel circuit 21 may be a 7TIC pixel circuit including seven pixel transistors and one capacitor shown in FIG. 2B; or the pixel circuit 21 may be a 2T1C pixel circuit including two pixel transistors and one capacitor; or the pixel circuit 21 may be a 4T1C pixel circuit including four pixel transistors and one capacitor; or the pixel circuit 21 may be a 5T2C pixel circuit including five pixel transistors and two capacitors; or the pixel circuit 21 may be an 8TIC pixel circuit including eight pixel transistors and one capacitor; or the pixel circuit 21 may be a 9T1C pixel circuit including nine pixel transistors and one capacitor. The following mainly describes the display 1 in this embodiment of this disclosure by using the 7T1C pixel circuit as an example.

As shown in FIG. 2B, in addition to the seven pixel transistors and the one capacitor C, the 7T1C pixel circuit further includes a light emitting device L, where the seven pixel transistors are respectively T1, T2, T3, T4, T5, T6, and T7. The pixel transistors T1, T2, T3, T6, and T7 may be low-temperature polycrystalline silicon (LTPS) thin-film transistors (TFTs), that is, P-type transistors. The pixel transistors T4 and T5 may be oxide TFTs, that is, N-type transistors. The capacitor C may be a storage capacitor. The light emitting device L may be a light-emitting diode (LED), and may be specifically an OLED. Correspondingly, the display 1 may be an OLED display. Alternatively, the light emitting device L may be a micro-LED. Correspondingly, the display 1 may be a micro-LED display. For ease of description, an example in which the light emitting device L is an OLED is used for description in the following.

Figure 3:
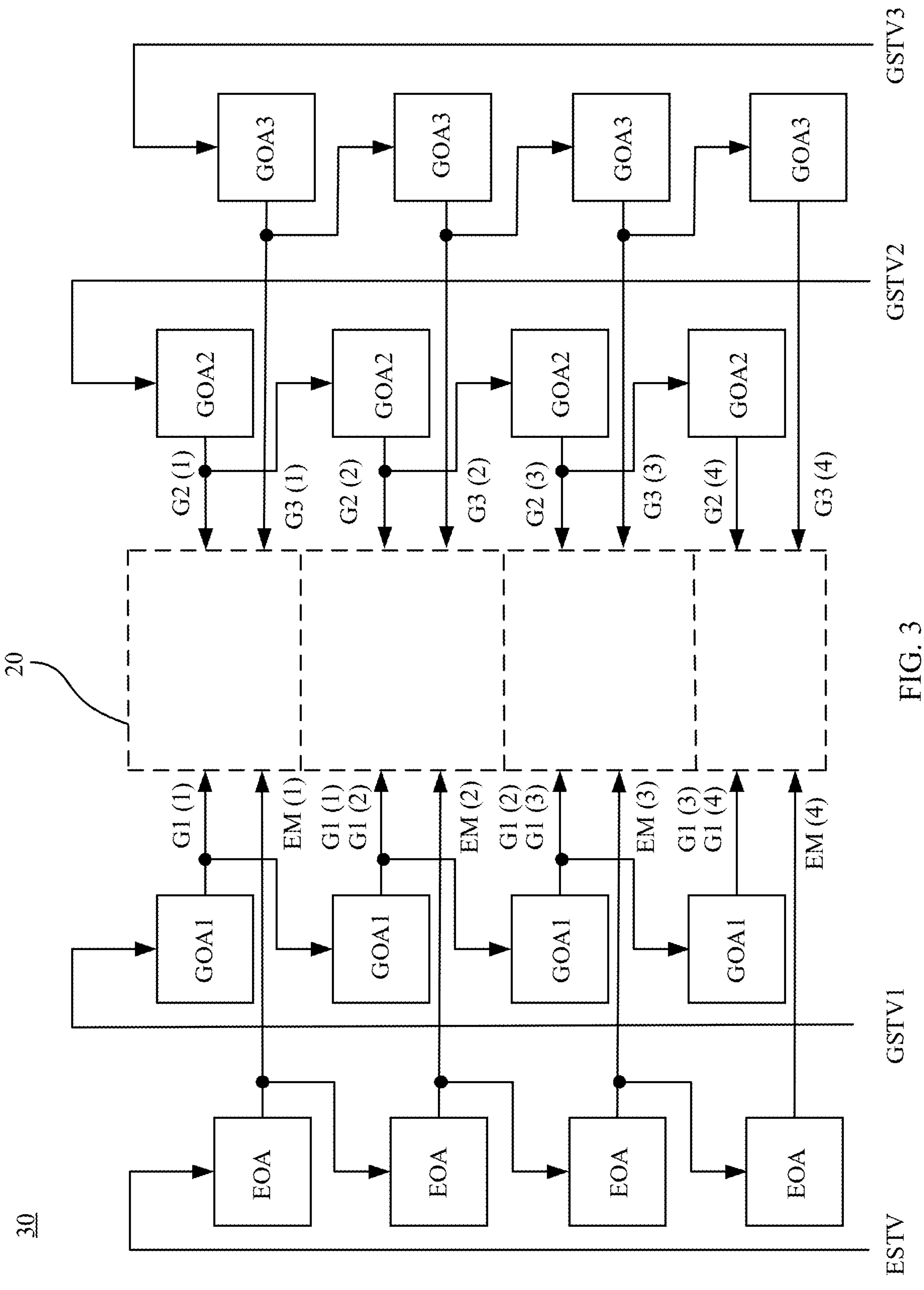
FIG. 3 is a circuit diagram of a scanning drive circuit in a related technology.

As shown in FIG. 3, the scanning drive circuit 30 includes M stages of first scanning units that are sequentially connected, M stages of second scanning units that are sequentially connected, M stages of third scanning units that are sequentially connected, and M stages of fourth scanning units that are sequentially connected. In this embodiment of this disclosure, an example in which the first scanning unit is an emit scanning drive circuit on array (EOA) integrated on an array substrate, and the second scanning unit, the third scanning unit, and the fourth scanning unit each are a gate scanning drive circuit on array (GOA) integrated on the array substrate is used for description. For ease of differentiation, the first scanning unit may be represented by an EOA, the second scanning unit may be represented by a GOA1, the third scanning unit may be represented by a GOA2, and the fourth scanning unit may be represented by a GOA3.

For example, as shown in FIG. 3, the pixel circuit array 20 includes four rows of pixel circuits, and a quantity of pixel circuits 21 in each row of pixel circuit is not limited. The quantity of M is 4. It indicates that the first scanning unit EOA, the second scanning unit GOA1, the third scanning unit GOA2, and the fourth scanning unit GOA3 are all at a fourth stage. Each stage of first scanning unit EOA, each stage of second scanning unit GOA1, each stage of third scanning unit GOA2, and each stage of fourth scanning unit GOA3 are respectively connected to each row of pixel circuit 21.

Figure 4:
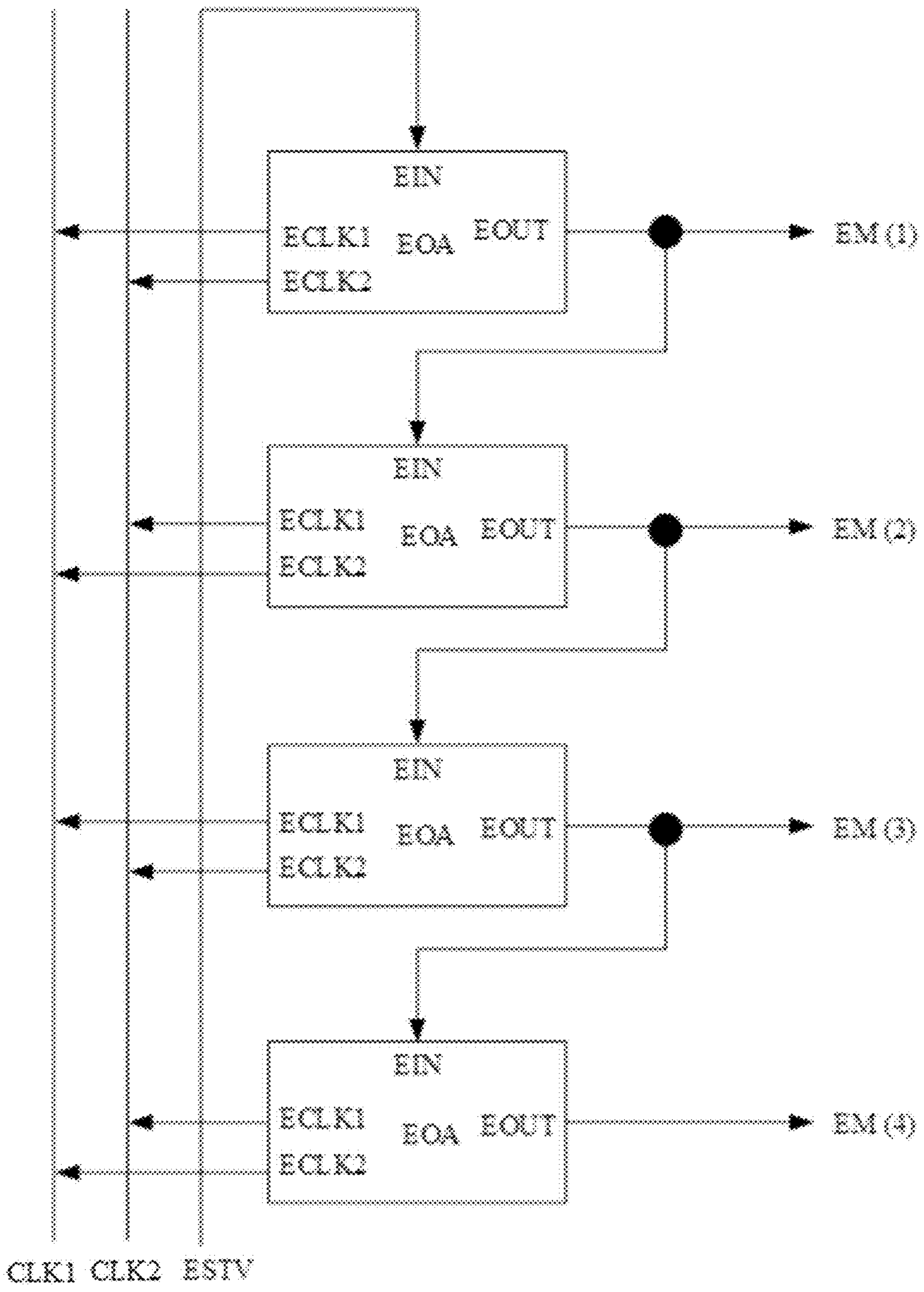
FIG. 4 is a diagram of a connection relationship of a plurality of stages of first scanning units in FIG. 3.

As shown in FIG. 4, the scanning drive circuit 30 may further include a column signal input end ESTV, a first clock signal end ECLK1, and a second clock signal end ECLK2, where the column signal input end ESTV, the first clock signal end ECLK1, and the second clock signal end ECLK2 are all connected to the displaying drive circuit 40 shown in FIG. 1.

As shown in FIG. 4, each stage of first scanning unit EOA includes an input end EIN, a first clock signal input end CLK1, a second clock signal input end CLK2, and an output end EOUT. An input end EIN of a first stage of first scanning unit EOA is connected to the column signal input end ESTV. An input end EIN of each of a second stage of first scanning unit EOA to an $M^{th}$ stage of first scanning unit EOA is separately connected to an output end EOUT of a previous stage of first scanning unit EOA. For example, the input end EIN of the second stage of first scanning unit EOA is connected to an output end EOUT of the first stage of first scanning unit EOA, the input end EIN of the third stage of first scanning unit EOA is connected to an output end EOUT of the second stage of first scanning unit EOA, and the rest may be deduced by analogy. In this way, a selection signal EM output by each of the first stage of first scanning unit EOA to an $(M-1)^{th}$ stage of first scanning unit EOA is input as an input signal to a next stage of first scanning unit EOA. For example, the output end EOUT of the first stage of first scanning unit EOA inputs an output selection signal EM (1) to the second stage of first scanning unit EOA, the output end EOUT of the second stage of first scanning unit EOA inputs an output selection signal EM (2) to the third stage of first scanning unit EOA, and the rest may be deduced by analogy.

In addition, an output end EOUT of each stage of first scanning unit EOA is correspondingly connected to each row of pixel circuit 21. For example, control electrodes of pixel transistors T1 and T6 in the first row of pixel circuit 21 are both connected to the output end EOUT of the first stage of first scanning unit EOA, control electrodes of pixel transistors T1 and T6 in a second row of pixel circuit 21 are both connected to the output end EOUT of the second stage of first scanning unit EOA, and the rest may be deduced by analogy. The first scanning unit EOA is configured to generate and send a selection signal EM to the pixel circuit 21. For example, each stage of first scanning unit EOA shown in FIG. 3 is respectively configured to generate and send a selection signal EM (1), EM (2), EM (3), or EM (4) to pixel transistors T1 and T6 in each row of pixel circuit 21 shown in FIG. 2B.

Two clock signals sent by the first clock signal end ECLK1 and the second clock signal end ECLK2 are a pair of clock signals that are opposite to each other. As shown in FIG. 4, a first clock signal input end CLK1 of an odd-numbered stage of first scanning unit EOA is connected to the first clock signal end ECLK1, and a second clock signal input end CLK2 of the odd-numbered stage of first scanning unit EOA is connected to the second clock signal end ECLK2. A first clock signal input end CLK1 of an even-numbered stage of EOA is connected to the second clock signal end ECLK2, and a second clock signal input end CLK2 of the even-numbered stage of EOA is connected to the first clock signal end ECLK1.

Figure 5:
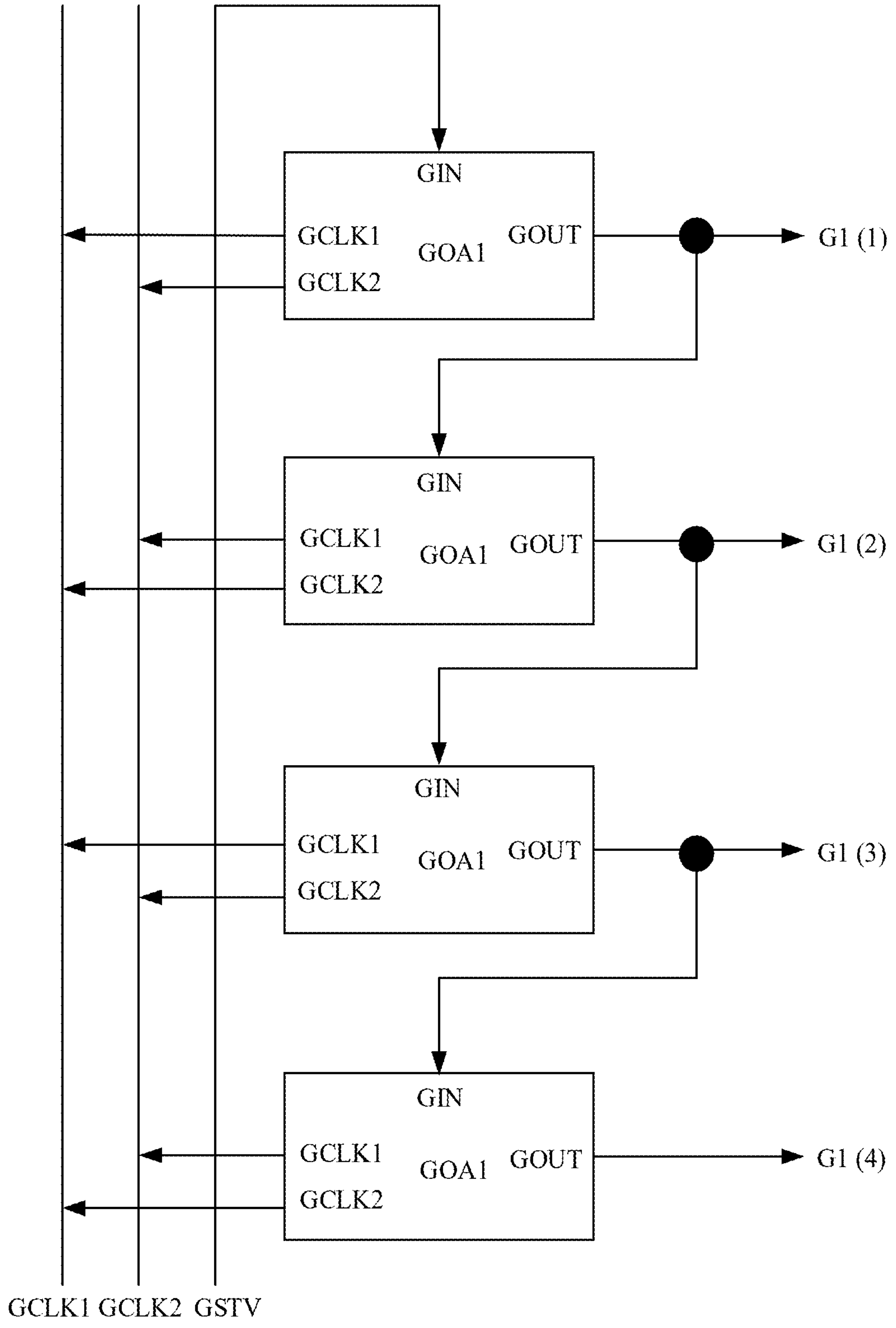
FIG. 5 is a diagram of a connection relationship of a plurality of stages of second scanning units in FIG. 3.

As shown in FIG. 5, the scanning drive circuit 30 may further include a column signal input end GSTV, a first clock signal end GCLK1, and a second clock signal end GCLK2, where the column signal input end GSTV, the first clock signal end GCLK1, and the second clock signal end GCLK2 are all connected to the displaying drive circuit 40 shown in FIG. 1.

As shown in FIG. 5, each stage of second scanning unit GOA1 includes an input end GIN, a first clock signal input end GCLK1, a second clock signal input end GCLK2, and an output end GOUT. An input end GIN of a first stage of second scanning unit GOAL is connected to the column signal input end GSTV. An input end GIN of each of a second stage of second scanning unit GOA1 to an $M^{th}$ stage of second scanning unit GOAL is separately connected to an output end GOUT of a previous stage of second scanning unit GOA. For example, the input end GIN of the second stage of second scanning unit GOAL is connected to an output end GOUT of the first stage of second scanning unit GOA1, the input end GIN of the third stage of second scanning unit GOA1 is connected to an output end GOUT of the second stage of second scanning unit GOA1, and the rest may be deduced by analogy. In this way, a selection signal G1 output by each of the first stage of second scanning unit GOA1 to an $(M-1)^t$h stage of second scanning unit GOAL is input as an input signal to a next stage of second scanning units GOA1. For example, the output end GOUT of the first stage of second scanning unit GOA1 inputs an output selection signal G1 (1) to the second stage of second scanning unit GOA1, the output end GOUT of the second stage of second scanning unit GOA1 inputs an output selection signal G1 (2) to the third stage of first scanning unit GOA1, and the rest may be deduced by analogy.

In addition, an output end GOUT of each stage of second scanning unit GOAL is correspondingly connected to each row of pixel circuit 21. For example, a control electrode of a pixel transistor T4 in each row of pixel circuit 21 is connected to an output end GOUT of each stage of second scanning unit GOA1, a control electrode of a pixel transistor T5 in the first row of pixel circuit 21 is connected to the displaying drive circuit 40 in FIG. 1, and control electrodes of pixel transistors T5 in the second row to the fourth row of pixel circuit 21 are all connected to output ends GOUT of the first stage of second scanning unit GOA1 to the third stage of second scanning unit GOA1. The second scanning unit GOAL is configured to generate and send a selection signal G1 to the pixel circuit 21. For example, each stage of first scanning unit GOA1 shown in FIG. 3 is respectively configured to generate and send a selection signal G1 (1), G1 (2), G1 (3), or G1 (4) to a pixel transistor T4 in each row of pixel circuit 21 shown in FIG. 2B. Each first scanning unit GOAL shown in FIG. 3 is respectively configured to generate and send a selection signal G1 (1), G1 (2), or G1 (3) to each pixel transistor T4 in the second row of pixel circuit 21 to the fourth row of pixel circuit 21 shown in FIG. 2B.

Two clock signals sent by the first clock signal end GCLK1 and the second clock signal end GCLK2 are a pair of clock signals that are opposite to each other. As shown in FIG. 5, a first clock signal input end CLK1 of an odd-numbered stage of second scanning unit GOAL is connected to the first clock signal end GCLK1, and a second clock signal input end CLK2 of the odd-numbered stage of second scanning unit GOAL is connected to the second clock signal end GCLK2. A first clock signal input end CLK1 of an even-numbered stage of second scanning unit GOAL is connected to the second clock signal end GCLK2, and a second clock signal input end CLK2 of the even-numbered stage of second scanning unit GOAL is connected to the first clock signal end GCLK1. Both the first clock signal end GCLK1 and the second clock signal end GCLK2 are connected to the displaying drive circuit 40 shown in FIG. 1. The displaying drive circuit 40 may send a first clock signal G_CLK1 to the first clock signal end GCLK1, and the displaying drive circuit 40 may send a second clock signal G_CLK2 to the second clock signal end GCLK2.

The third scanning unit GOA2 may have a same structure as the GOA1. An output end of each stage of third scanning unit GOA2 is correspondingly connected to a control electrode of a pixel transistor T7 in each row of pixel circuit shown in FIG. 2B, and an input end of each of a second stage of third scanning unit GOA2 to an $M^{th}$ stage of third scanning unit GOA2 is separately connected to an output end GOUT 2 of a previous stage of third scanning unit GOA2. The third scanning unit is configured to generate a selection signal G2 ($m$). For example, each stage of third scanning unit shown in FIG. 3 is respectively configured to generate and send a selection signal G2 (1), G2 (2), G2 (3), or G2 (4) to a pixel transistor T7 in each row of pixel circuit 21 shown in FIG. 2B.

The fourth scanning unit GOA3 may have a same structure as the GOA1. A fifth output end of each stage of fourth scanning unit GOA3 is correspondingly connected to a control electrode of the pixel transistor T7 in each row of pixel circuit shown in FIG. 2B, and an input end of each of a second stage of fourth scanning unit GOA3 to an $M^{th}$ stage of fourth scanning unit GOA3 is separately connected to an output end of a previous stage of fourth scanning unit GOA3. The fourth scanning unit is configured to generate a selection signal G3 ($m$). For example, each stage of fourth scanning unit shown in FIG. 3 is respectively configured to generate and send a selection signal G3 (1), G3 (2), G3 (3), or G3 (4) to a pixel transistor T2 in each row of pixel circuit 21 shown in FIG. 2B.

Figure 6:
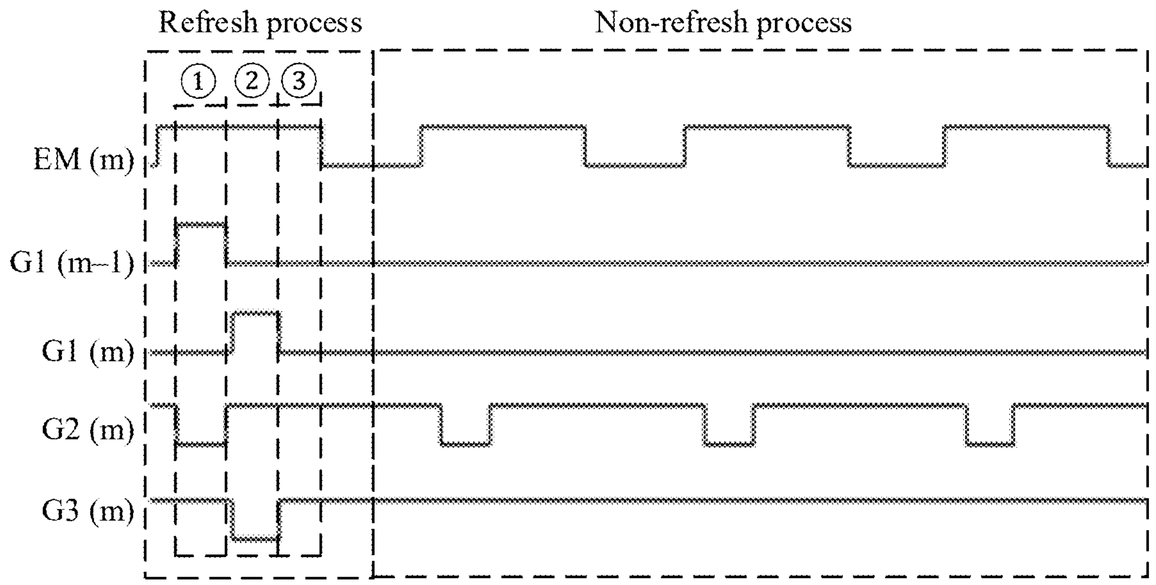
FIG. 6 is a sequence diagram corresponding to the scanning drive circuit shown in FIG. 3.
Figure 7:
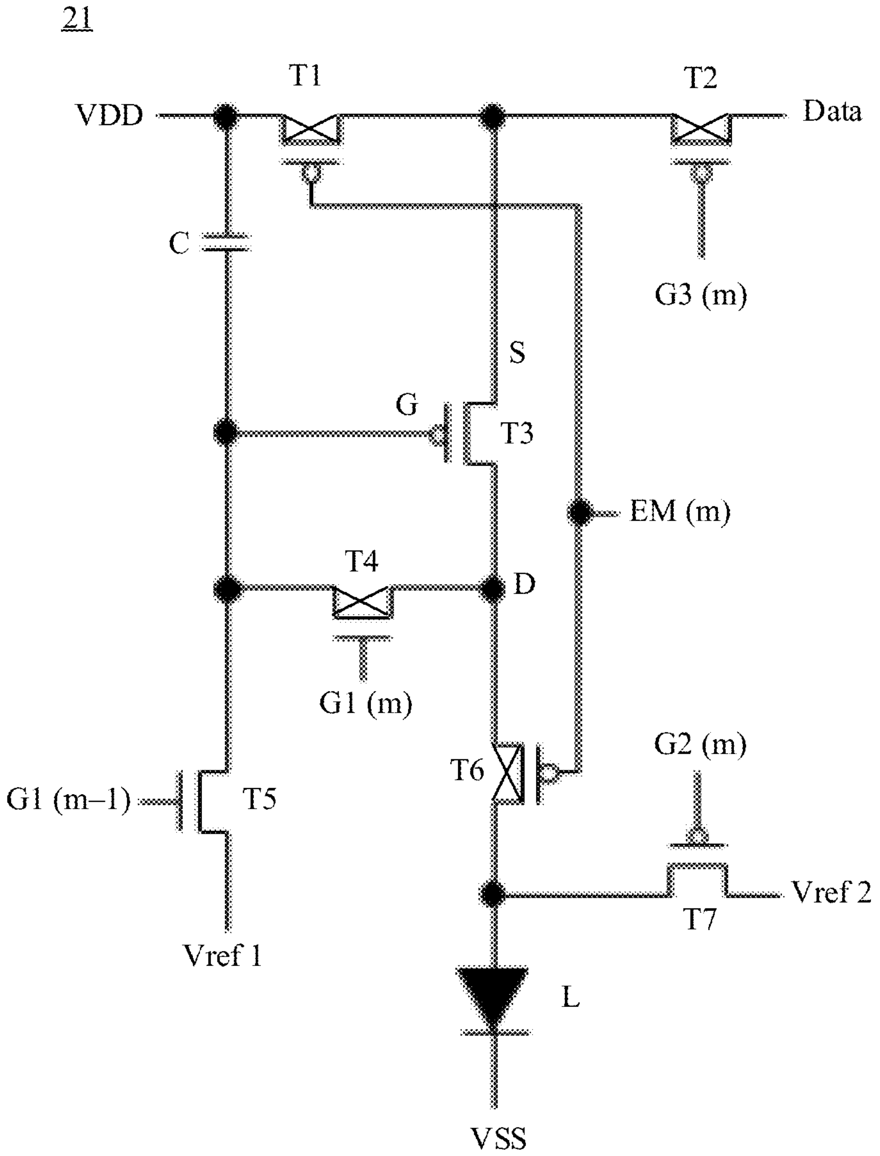
FIG. 7 is a diagram of conduction and cut-off of pixel transistors in a first phase ① in FIG. 6.
Figure 8:
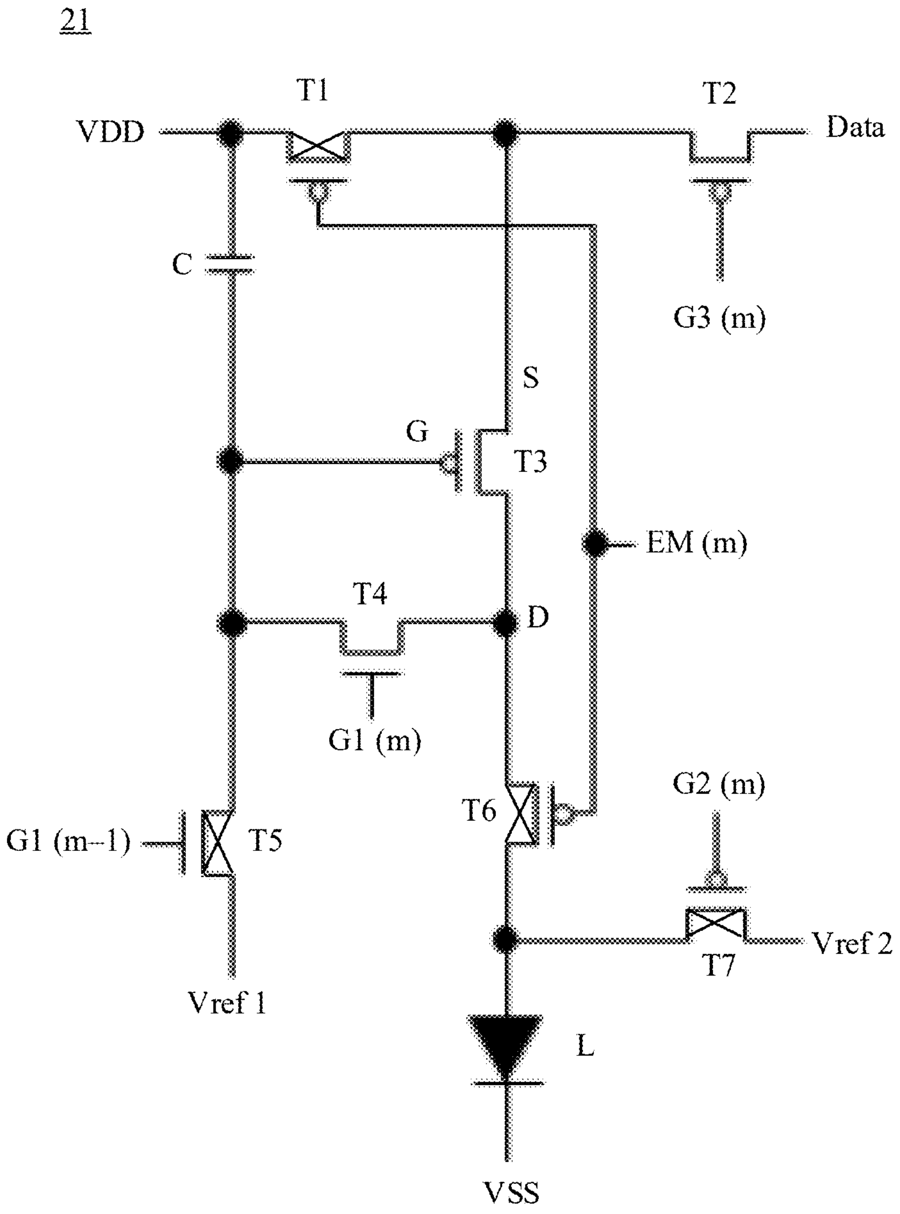
FIG. 8 is a diagram of conduction and cut-off of pixel transistors in a second phase ② in FIG. 6.
Figure 9:
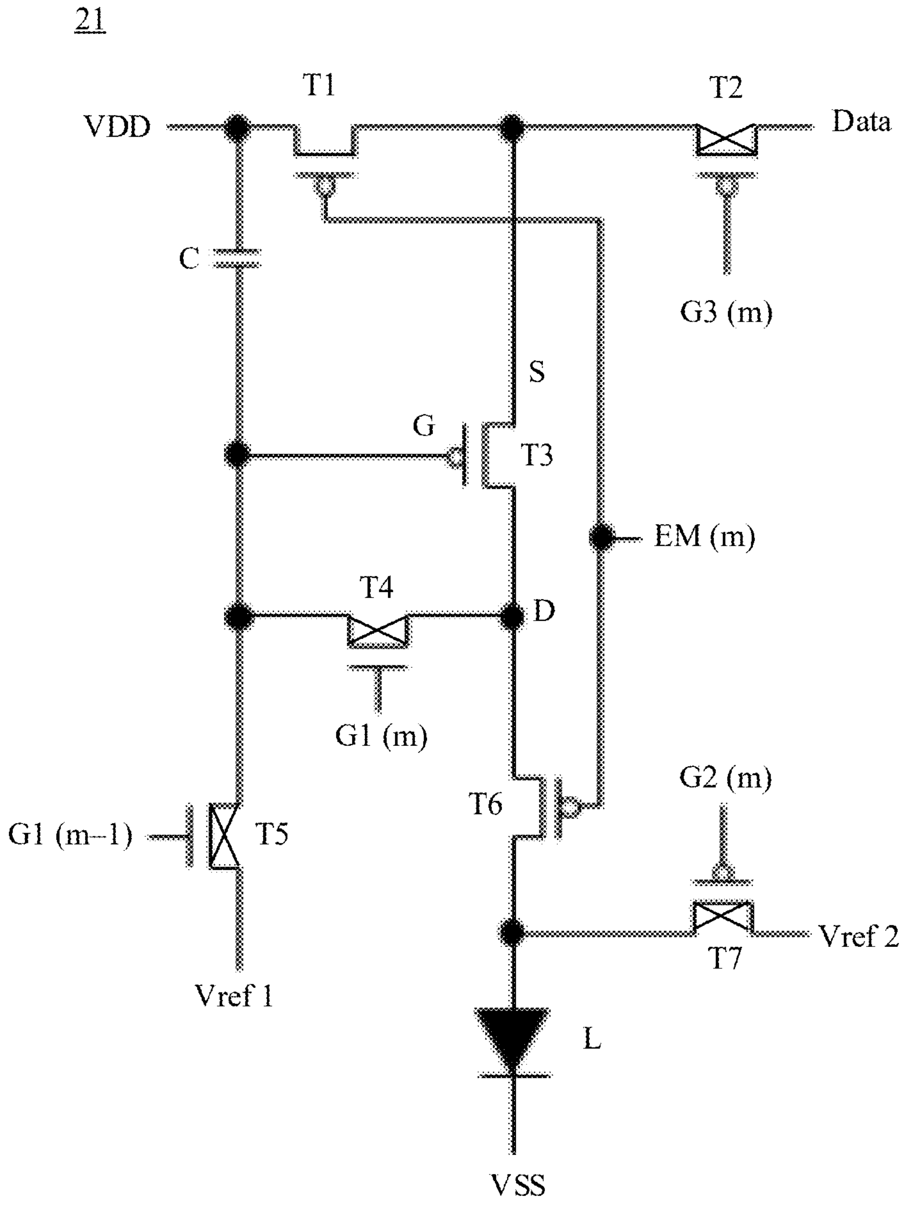
FIG. 9 is a diagram of conduction and cut-off of pixel transistors in a third phase ③ in FIG. 6.

Based on the structure of the pixel circuit 21 shown in FIG. 2B, because the display 1 is periodically refreshed at a refresh rate, as shown in FIG. 6, a working process of the pixel circuit 21 may include a refresh process and a non-refresh process. The refresh process may include three phases shown in FIG. 7, FIG. 8, and FIG. 9, and the three phases are respectively a first phase ① a second phase ②, and a third phase ③. As shown in FIG. 7, FIG. 8, and FIG. 9, for ease of description, an "X" mark is added to a pixel transistor that is cut off, and a pixel transistor to which no "X" mark is added is a pixel transistor that is conducted.

In the first phase ①, the phase may be a reset phase. In this phase, as shown in FIG. 6, a selection signal G1 (m−1), a selection signal EM (m), and a selection signal G3 ($m$) are high-level signals, and a selection signal G1 ($m$) and a selection signal G2 ($m$) are low-level signals. As shown in FIG. 7, in this case, pixel transistors T5 and T7 are conducted, and pixel transistors T1, T2, T4, and T6 are cut off. A first reference signal Vref 1 resets a node G through the pixel transistor T5, and a second reference signal Vref 2 resets an anode of the light emitting device L through the pixel transistor T7.

In the second phase ②, the phase may be a compensation phase. In this phase, as shown in FIG. 6, the selection signal G1 ($m$), the selection signal G2 ($m$), and the selection signal EM (m) are high-level signals, and the selection signal G1 (m−1) and the selection signal G3 ($m$) are low-level signals. As shown in FIG. 8, in this case, the pixel transistors T2 and T4 are conducted, and the pixel transistors T1, T5, T6, and T7 are cut off. A data signal Data transmits a data voltage Vdata to a gate electrode G of the pixel transistor T3, and T3 is cut off when a gate electrode potential VG=Vdata+Vth. Herein, Vth represents a threshold voltage of the pixel transistor T3.

In the third phase ③, the phase may be a light emitting phase. In this phase, as shown in FIG. 6, the selection signal G2 (*m*) and the selection signal G3 (*m*) are high-level signals, and the selection signal G1 (m−1), the selection signal G1 (*m*), and the selection signal EM (m) are low-level signals. As shown in FIG. 9, in this case, the pixel transistors T1, T3, and T6 are conducted, and the pixel transistors T2, T4, T5, and T7 are cut off. A voltage drain drain VDD, the pixel transistors T1, T3, and T6, and a voltage source source VSS form a loop, and the light emitting device L emits light. A light emitting current I of the light emitting device L is:

$$I = \mu Cox\frac{W}{L(VGS - Vth)}^2 = \mu Cox\frac{W}{L(Vdata - VDD)}^2$$

In the foregoing formula, μ represents an electron mobility, Cox represents a channel capacitance of a pixel transistor per unit area, W represents a channel width of the pixel transistor T3, L represents a channel length of the pixel transistor T3, VGS represents a gate electrode G and a source electrode S of the pixel transistor T3, Vth represents a threshold voltage of the gate electrode of the pixel transistor T3, V data represents a data voltage, and VDD represents a voltage drain drain.

In the non-refresh process, to improve flickering of the display 1, the pixel transistors T1, T6, and T7 usually need to be periodically conducted and cut off in the non-refresh process. In this way, as shown in FIG. 6, the selection signal EM (m) and the selection signal G2 (*m*) are high-frequency signals to implement pulse-width modulation (PWM) dimming.

Figure 10:
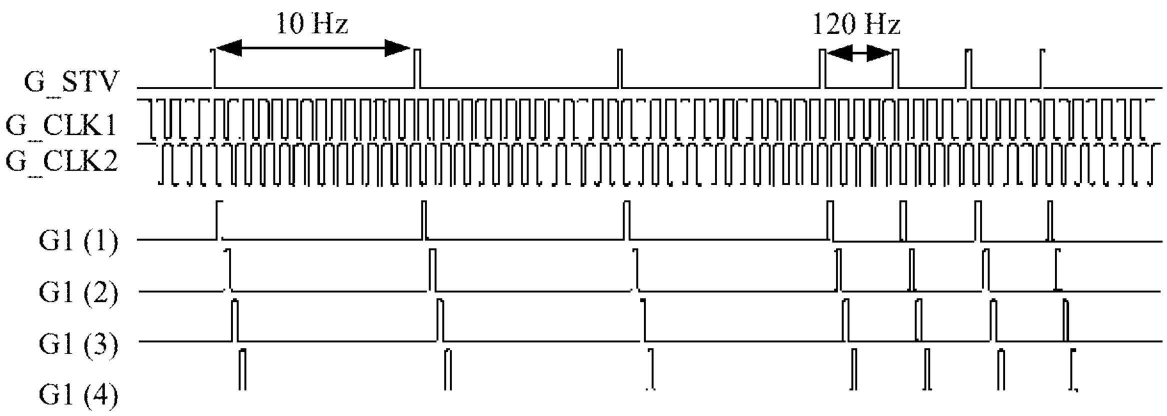
FIG. 10 is a sequence diagram in which different refresh rates are used in the scanning drive circuit shown in FIG. 3 at different moments.

As shown in FIG. 3, in the refresh process, the display area in the display 1 needs to be refreshed row by row from the first row to the last row. For example, as shown in FIG. 10, a column signal input end GSTV transmits a column signal G_STV to a first stage of GOA1, where the column signal G_STV is a pulse signal, and a frequency of the pulse signal is 10 Hz. The first stage of GOA1 transmits a selection signal G1 (1) to a first row of pixel circuit. Similarly, a first stage of first scanning unit EOA also transmits a selection signal EM (1) to the first row of pixel circuit 21. A first stage of third scanning unit GOA2 also transmits a selection signal G2 (1) to the first row of pixel circuit, a first stage of fourth scanning unit GOA3 transmits a selection signal G3 (1) to the first row of pixel circuit 21, and the first row of pixel circuit 21 of the display 1 is refreshed. The first stage of second scanning unit GOA1 further transmits the selection signal G1 (1) to a second stage of second scanning unit GOA1, the second stage of second scanning unit GOA1 transmits a selection signal G1 (2) to the pixel circuit 21, a second stage of first scanning unit EOA, a second stage of third scanning unit GOA2, and a second stage of fourth scanning unit GOA3 respectively transmit selection signals EM (2), G2 (2), and G3 (2) to the first row of pixel circuit 21, so that a second row of pixel circuit 21 of the display 1 is refreshed, and the rest may be deduced by analogy until all pixel circuits 21 are refreshed.

In addition, it may be understood that the refresh rate of the display 1 is mainly the frequency of the column signal G_STV input by the column signal input end GTSV. Therefore, the frequency of the column signal G_STV of the column signal input end GSTV may be adjusted in real time based on content displayed on a video interface or a game interface.

Figure 11:
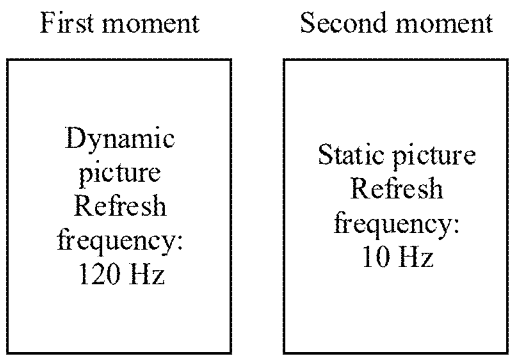
FIG. 11 is a diagram in which different refresh rates are used in a display area at different moments.

To improve video or game experience, the refresh rate of the display 1 is usually high. For example, the refresh rate may be 120 Hz. Consequently, power consumption is high, and a battery life of the electronic device is reduced. To reduce power consumption and improve a battery life, in a video or game scenario, images displayed in a display area at different moments are different. For example, as shown in FIG. 11, if a dynamic image is displayed in the display area at a first moment, the display area may refresh the display at a high refresh rate, for example, 120 Hz; and if a static image is displayed in the display area at a second moment, the display may be refreshed at a low refresh rate, for example, 10 Hz.

Figure 12:
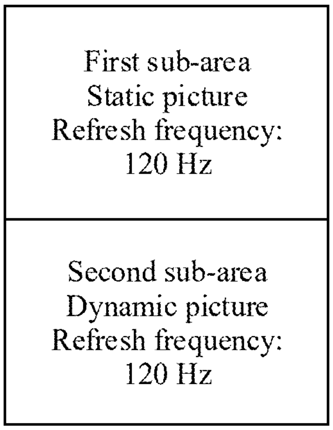
FIG. 12 is a diagram in which a same refresh rate is used in different sub-areas of a display area at a same moment.

However, on a video interface or a game interface, as shown in FIG. 12, in an entire display area, a picture displayed in a first sub-area is a static picture, and a picture displayed in a second sub-area is a dynamic picture. When the entire display area including the first sub-area in which the dynamic picture is displayed and the second sub-area in which the static picture is displayed is refreshed at a same and high refresh rate, for example, 120 Hz, a problem of high-power consumption still exists.

Figure 13A:
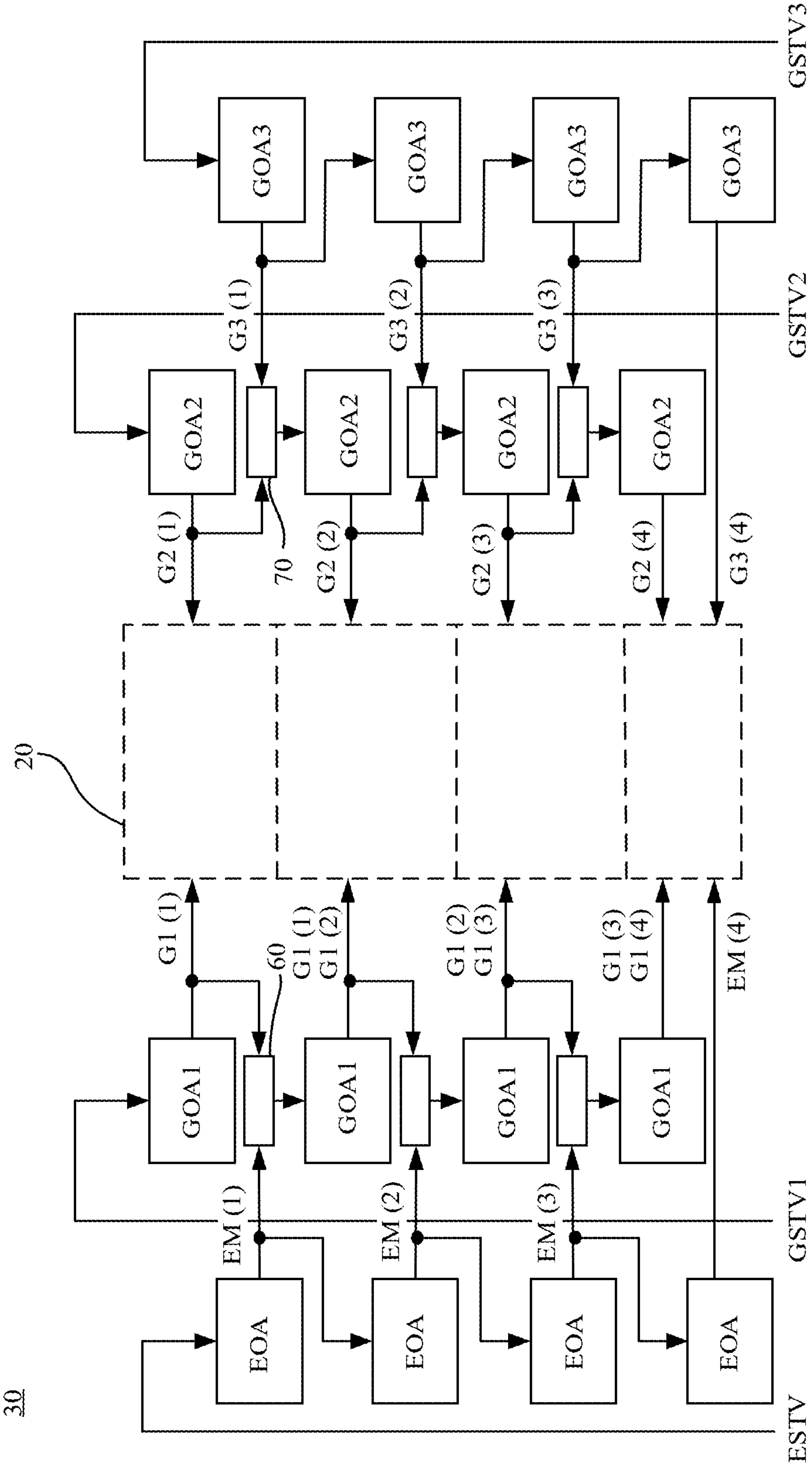
FIG. 13A is a diagram of a structure of a scanning drive circuit according to a first embodiment of this disclosure.

Based on this, as shown in FIG. 13A, a first selection circuit 60 and a second selection circuit 70 are added to the scanning drive circuit 30 provided in this embodiment of this disclosure based on the embodiment shown in FIG. 3.

A quantity of first selection circuits 60 and a quantity of second selection circuits 70 may be both N, where N may be an integer greater than or equal to 1. In other words, there may be one or more first selection circuits 60. There may be one or more second selection circuits 70. In this embodiment, N is greater than 1, and N+1=M. For example, as shown in FIG. 13A, a quantity of first scanning units BOA and a quantity of second scanning units GOA1 are both 4, and a quantity of first selection circuits 60 and a quantity of second selection circuits 70 are both 3.

Figure 14A:
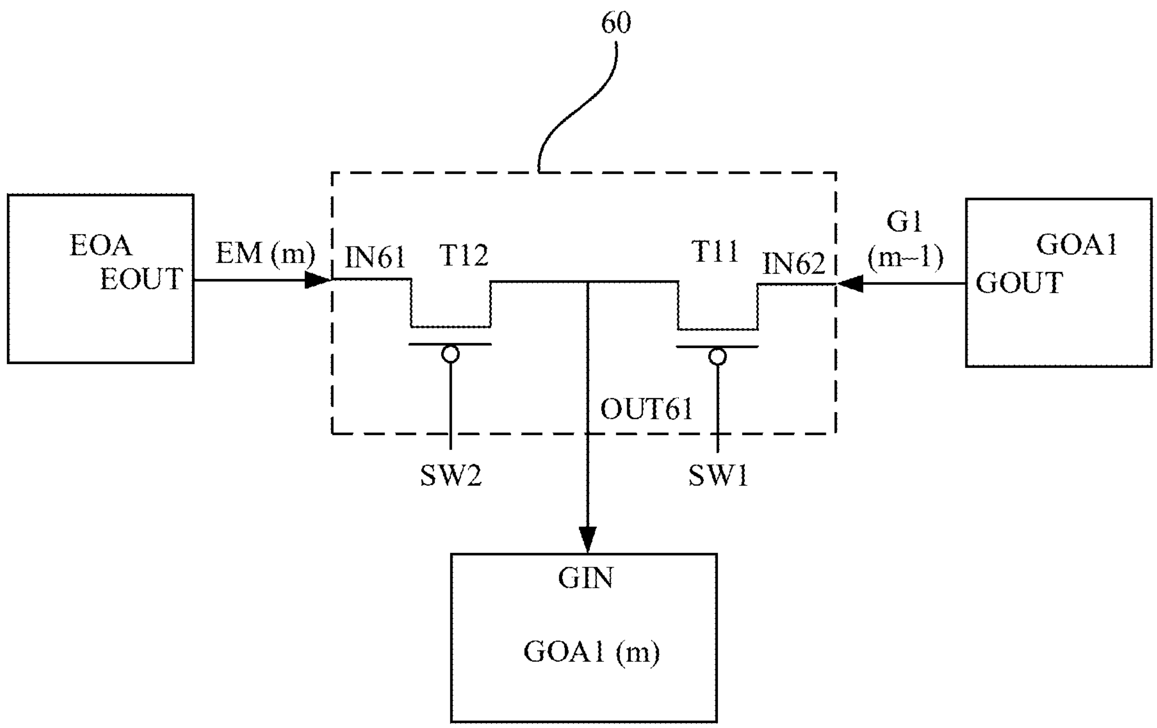
FIG. 14A is a diagram of a connection relationship between an $m^{th}$ stage of first scanning unit, an $(m-1)^{th}$ stage of second scanning unit, an $m^{th}$ stage of second scanning unit, and a first selection circuit in FIG. 13B.

As shown in FIG. 14A, the first selection circuit 60 includes a first input end IN61, a second input end IN62, an output end OUT61, a first switching transistor T11, a second switching transistor T12, a first drive signal input end SW1, and a second drive signal input end SW2. A second electrode of the first switching transistor T12 is used as the second input end IN62, a first electrode of the second switching transistor T12 is connected to a second electrode of the first switching transistor T11, and is used as the output end OUT61, and a first electrode of the first switching transistor T11 is used as the second input end IN62. A control electrode of the first switching transistor is connected to the first drive signal input end SW1, and a control electrode of the second switching transistor T12 is connected to the second drive signal input end SW2. Both the first drive signal input end SW1 and the second drive signal input end SW2 are connected to the displaying drive circuit 40 shown in FIG. 1. The displaying drive circuit 40 may send a first drive signal S-W1 to the first drive signal input end SW1, and the displaying drive circuit may further send a second drive signal S-W2 to the second drive signal input end SW2.

As shown in FIG. 14A, the first input end IN61 of the first selection circuit 60 is connected to an output end EOUT of an $m^{th}$ stage of first scanning unit EOA, the second input end IN62 of the first selection circuit 60 is connected to an output end GOUT of an $(m-1)^{th}$ stage of second scanning unit GOA1, and the output end OUT61 of the first selection circuit 60 is connected to an input end GIN of an $m^{th}$ stage of second scanning unit GOA1.

Figure 15:
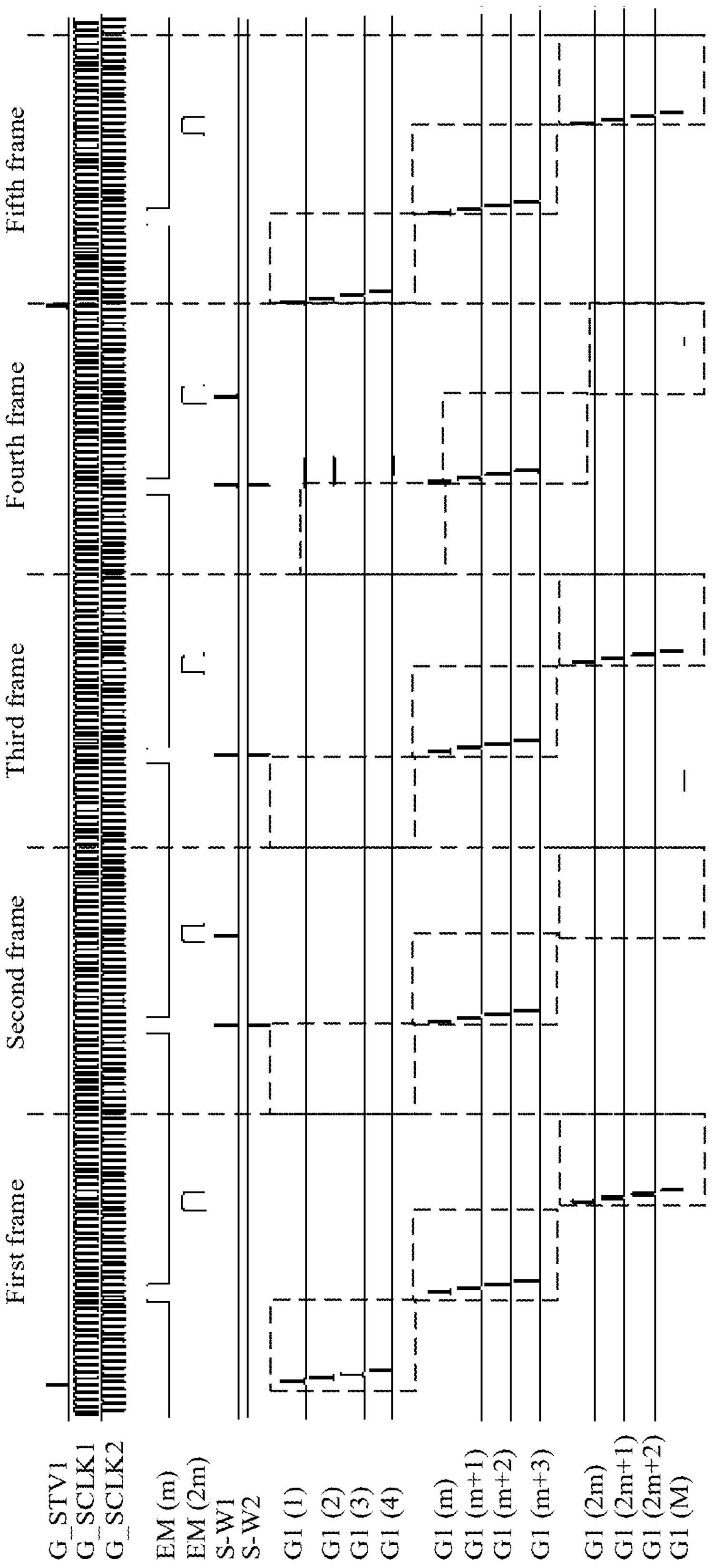
FIG. 15 is a first-time sequence diagram corresponding to the scanning drive circuit shown in FIG. 13A.

The first selection circuit 60 may receive a selection signal EM (m) output by the $m^{th}$ stage of first scanning unit EOA, receive a selection signal G1 (m−1) output by the $(m-1)^{th}$ stage of second scanning unit GOA1, and receive a first drive signal S-W1 and a second drive signal S-W2 that are sent by the scanning drive circuit 30 shown in FIG. 1. The selection signal EM (m) may be a first pulse signal. As shown in FIG. 15, the selection signal G1 (m−1) may be a second pulse signal, and both the first drive signal S-W1 and the second drive signal S-W2 may be pulse signals.

The first selection circuit 60 may transmit the selection signal EM (m), or transmit the selection signal G1 (m−1) to the $m^{th}$ stage of second scanning unit GOA2 based on the first drive signal S-W1 and the second drive signal S-W2, or may not transmit a selection signal.

In this embodiment, both the first switching transistor T11 and the second switching transistor T12 may be P-type transistors. In another implementation, both the first switching transistor T11 and the second switching transistor T12 may be N-type transistors; or the first switching transistor T11 is a P-type transistor, and the second switching transistor T12 is an N-type transistor; or the first switching transistor T11 is an N-type transistor, and the second switching transistor T12 is a P-type transistor.

Figure 14B:
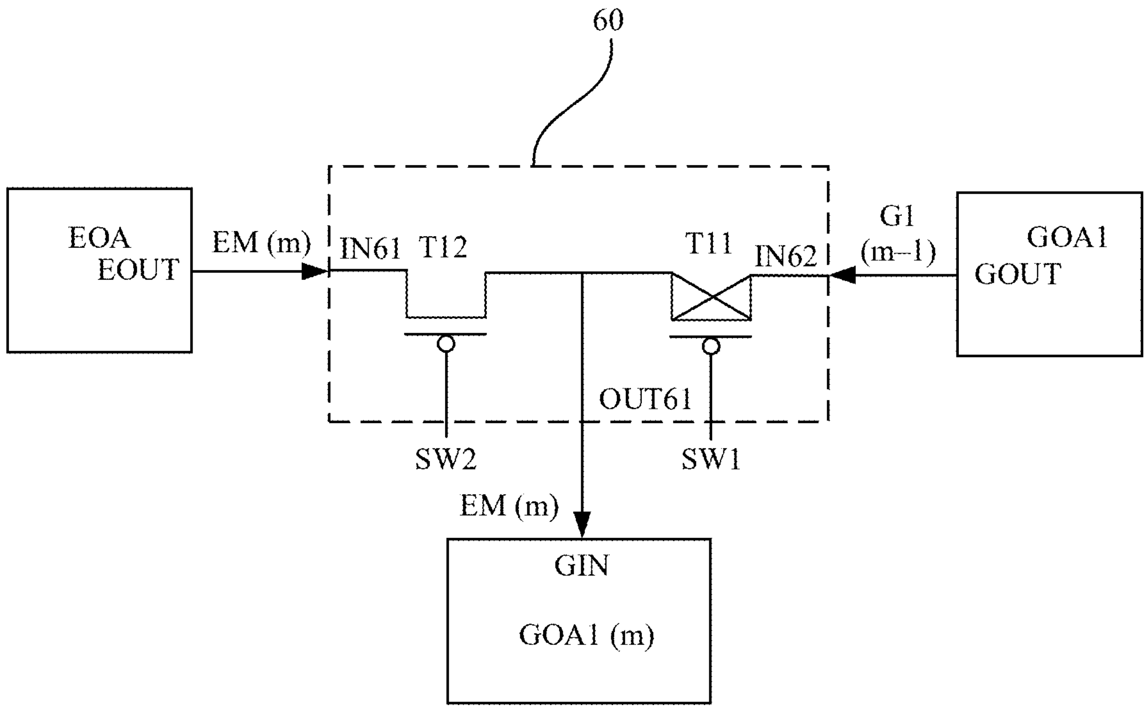
FIG. 14B is a diagram of conduction and cut-off of a first switching transistor and a second switching transistor in FIG. 14A in a first case.

In this embodiment, when the first drive signal S-W1 transmitted to a control electrode of the first switching transistor T11 is a high-level signal, and the second drive signal S-W2 transmitted to a control electrode of the second switching transistor T11 is a low-level signal, as shown in FIG. 14B, the first switching transistor T11 is cut off, the second switching transistor T12 is conducted, and the first selection circuit 60 transmits the selection signal EM (m) to the $m^{th}$ stage of second scanning unit GOA1.

Figure 14C:
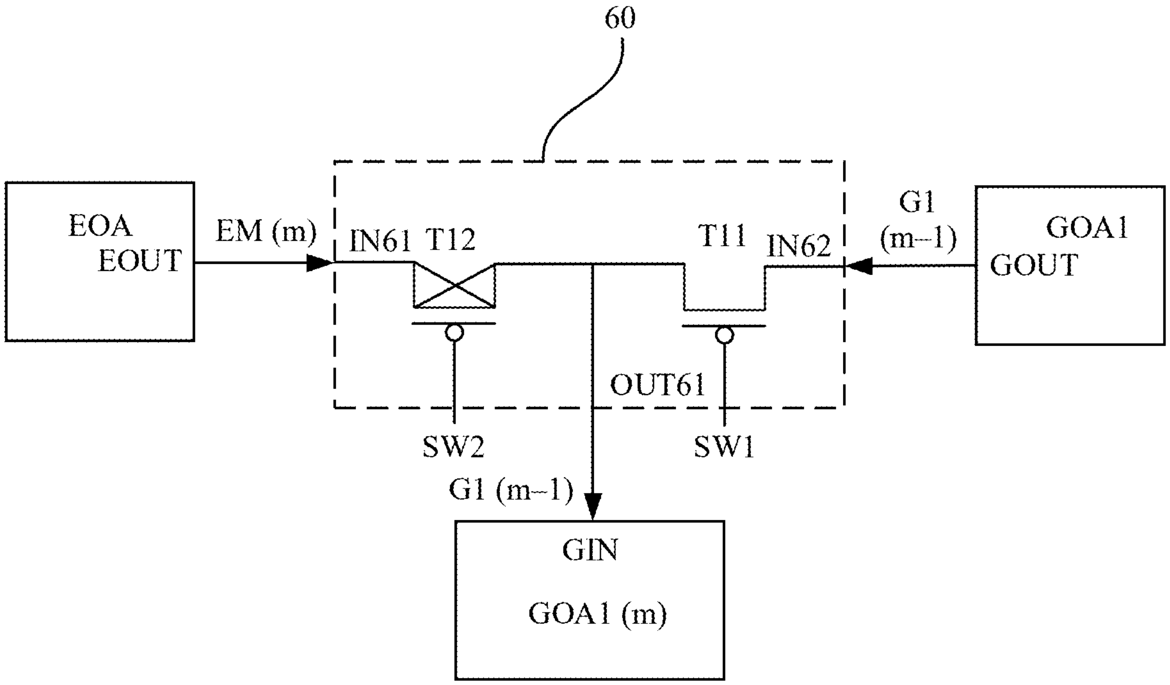
FIG. 14C is a diagram of conduction and cut-off of a first switching transistor and a second switching transistor in FIG. 14A in a second case.

When the first drive signal S-W1 is a low-level signal, and the second drive signal S-W2 is a high-level signal, as shown in FIG. 14C, the first switching transistor T11 is conducted, the second switching transistor T12 is cut off, and the first selection circuit 60 transmits the selection signal G1 (m−1) to the $m^{th}$ stage of second scanning unit GOA1.

Figure 14D:
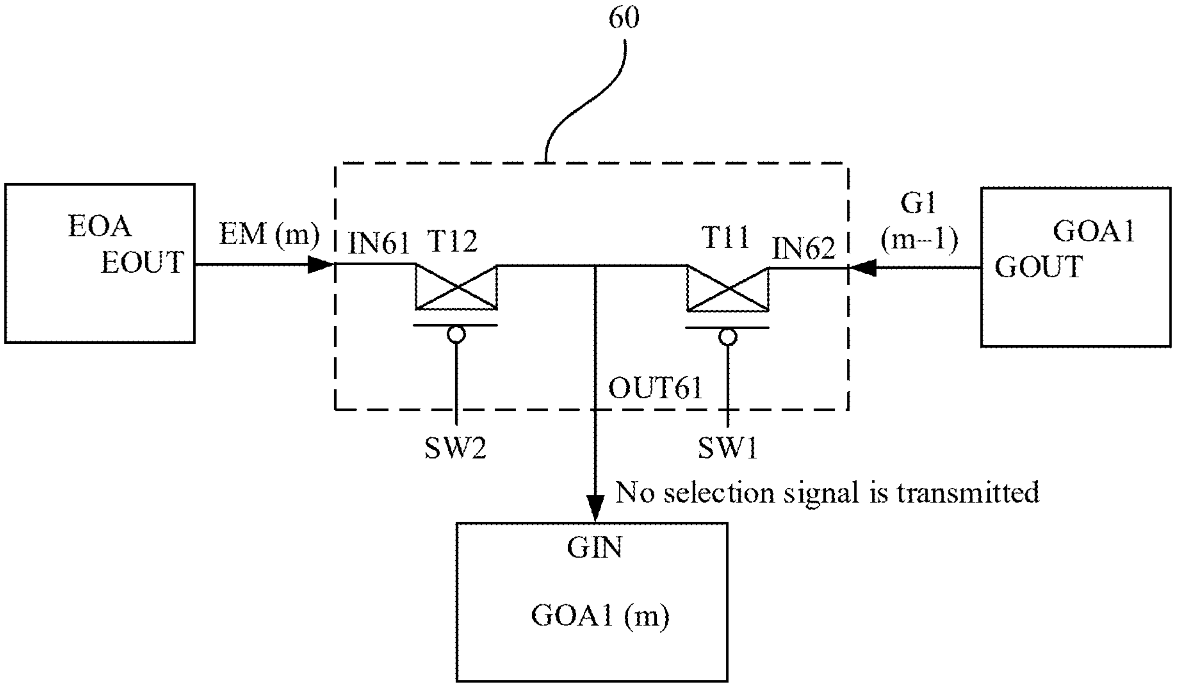
FIG. 14D is a diagram of conduction and cut-off of a first switching transistor and a second switching transistor in FIG. 14A in a third case.

When both the first drive signal S-W1 and the second drive signal S-W2 are high-level signals, as shown in FIG. 14D, both the first switching transistor T11 and the second switching transistor T12 are cut off, the selection signal EM (m) cannot pass through the second switching transistor T12, and the selection signal G1 (m−1) cannot pass through the first switching transistor T11. Therefore, the first selection circuit 60 does not transmit a selection signal to the $m^{th}$ stage of second scanning unit GOA1.

Figure 13B:
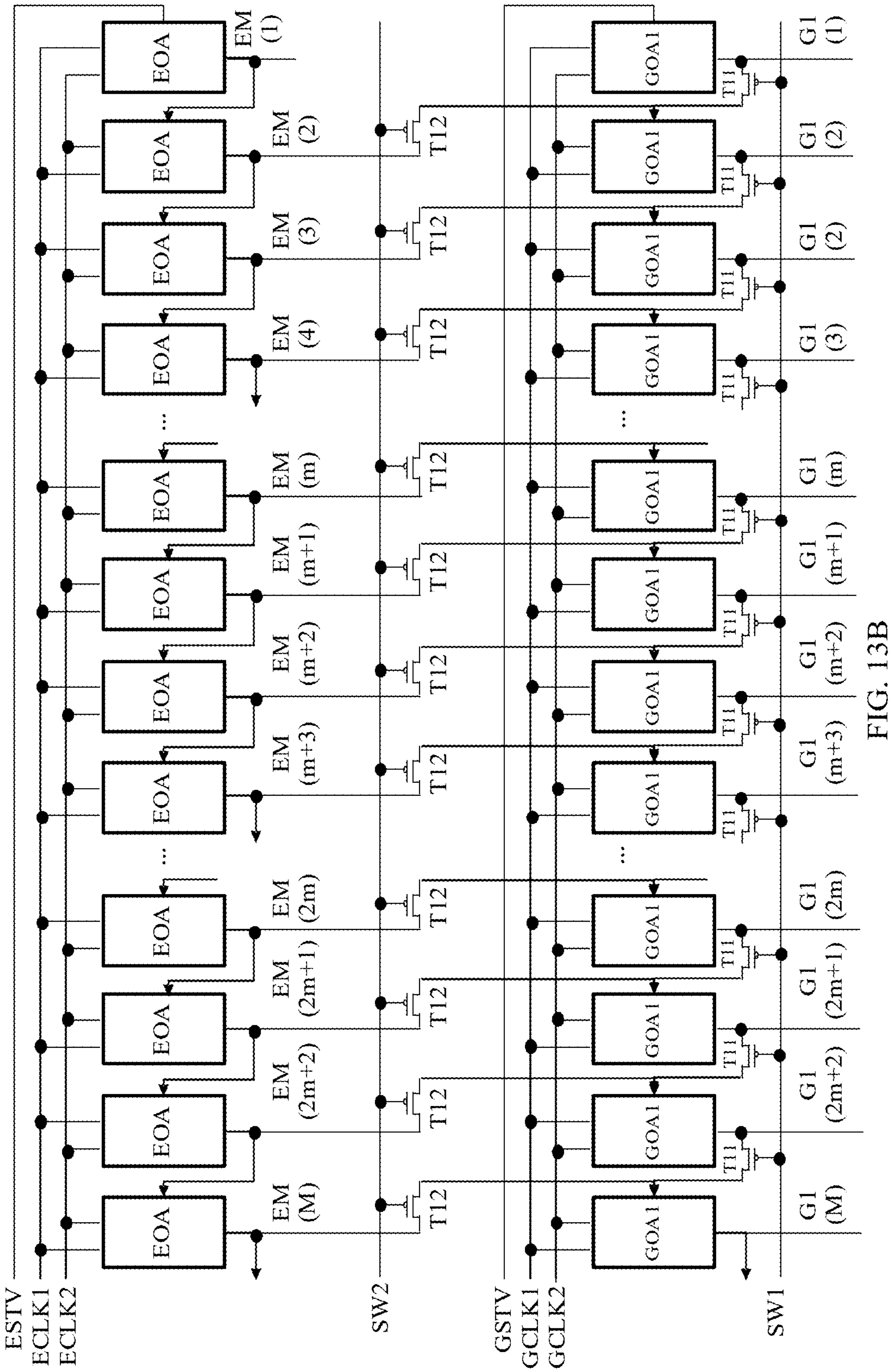
FIG. 13B is a diagram of connection relationships between M stages of first scanning units, M stages of second scanning units, and N first selection circuits according to a first embodiment of this disclosure.

When the quantity N of the first selection circuits 60 is greater than 1, as shown in FIG. 13B, first input ends of the N first selection circuits 60 are respectively connected to output ends of a first stage of first scanning unit EOA to an $(M-1)^{th}$ stage of first scanning unit EOA, and second input ends of the N first selection circuits 60 are respectively connected to output ends of a first stage of second scanning unit GOAL to an $(M-1)^{th}$ stage of second scanning unit GOA1, and output ends of the N first selection circuits 60 are respectively connected to input ends of a second stage of second scanning unit GOA1 to an $M^{th}$ stage of second scanning unit GOA1. In other words, except the first stage of second scanning unit GOA1, an input end of another stage of second scanning units GOAL is connected to an output end of a previous stage of second scanning unit GOA1 and an output end of a previous stage of first scanning unit through the first selection circuit.

Figure 16A:
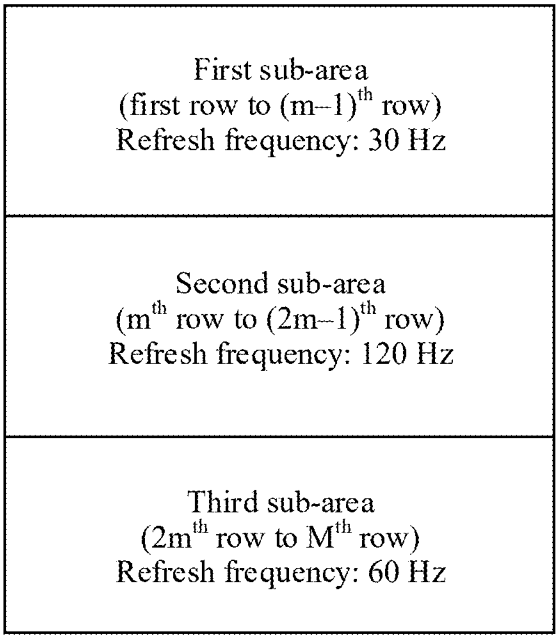
FIG. 16A is a first diagram in which different refresh rates are used in a plurality of different sub-areas.

A frequency of a column signal E_STV transmitted to the column signal input end ESTV may be set to be different from a frequency of a column signal G_STV1 transmitted to a column signal input end GSTV1. For example, the frequency of the column signal E_STV is set to 120 Hz, and the frequency of the column signal G_STV1 is set to 30 Hz. In this embodiment, as shown in FIG. 16A, the display area may be divided into three sub-areas: a first sub-area, a second sub-area, and a third sub-area. The first sub-area includes an area corresponding to a first row of pixel circuit to an $(m-1)^{th}$ row of pixel circuit, the second sub-area includes an area corresponding to an $m^{th}$ row of pixel circuit to a $(2m-1)^{th}$ row of pixel circuit, and the third sub-area includes an area corresponding to a $2m^{th}$ row of pixel circuit to an $M^{th}$ row of pixel circuit. The following describes working principles of the first scanning unit EOA, the second scanning unit GOA1, and the first selection circuit 60 by using an example in which the display area is divided into three sub-areas, but refresh rates of the first sub-area, the second sub-area, and the third sub-area are respectively 30 Hz, 120 Hz, and 60 Hz.

As shown in FIG. 15, when the $m^{th}$ row of pixel circuit is scanned, both a selection signal EM output by the $m^{th}$ stage of first scanning unit and a selection signal G1 (*m*) output by the $m^{th}$ stage of second scanning unit that correspond to the $m^{th}$ row of pixel circuit are high-level signals, and the $m^{th}$ row of pixel circuit may be driven.

As shown in FIG. 16A, for a first frame of image, the first sub-area, the second sub-area, and the third sub-area are all refreshed. Therefore, the first drive signal S-W1 is set to be a low-level signal, the first switching transistor T11 is conducted, the second drive signal S-W2 is set to be a high-level signal, and the second switching transistor T12 is cut off. In this case, input ends GIN of the second stage of second scanning unit GOA1 to the $M^{th}$ stage of second scanning unit GOA1 all receive a selection signal G1 output by a previous stage of second scanning unit GOA1. The first stage of second scanning unit GOA1 to the $M^{th}$ stage of second scanning unit GOA1 sequentially output a selection signal G1 that is a high-level signal, the first stage of first scanning unit EOA to the $M^{th}$ stage of first scanning unit EOA sequentially output a selection signal EM 1 that is a high-level signal, all pixel circuits 21 are sequentially scanned, and the entire display area is refreshed.

As shown in FIG. 16A, for a second frame of image, the column signal E_STV is a high-level signal, and the column signal G_STV1 is a low-level signal.

The first sub-area does not need to be refreshed. In a process of scanning the first row of pixel circuit to the $(m-1)^{th}$ row of pixel circuit 21 that correspond to the first sub-area, the first drive signal S-W1 is maintained as a low-level signal, the second drive signal S-W2 is maintained as a high-level signal, the column signal G_STV1 received by the first stage of second scanning unit GOAL is a low-level signal, and the selection signal G1 output by the first stage of second scanning unit GOAL is also a low-level signal. Therefore, selection signals G1 received by and selection signals G1 output by the second stage of second scanning unit GOA1 to the $(m-1)^{th}$ stage of second scanning unit GOA1 are all low-level signals.

The second sub-area needs to be refreshed. When the $m^{th}$ row of pixel circuit 21 is scanned, the first drive signal S-W1 is set to be a high-level signal, and the first switching transistor T11 is cut off. If the second drive signal S-W2 is set to be a low-level signal, and the second switching transistor T12 is conducted, a selection signal EM (m−1) output by the $(m-1)^{th}$ row of first scanning unit EOA is transmitted to the $m^{th}$ stage of second scanning unit GOA1 through the second switching transistor 12, the selection signal G1 (*m*) output by the $m^{th}$ stage of second scanning unit GOAL is a high-level signal, and the $m^{th}$ row of pixel circuit 21 may be refreshed. When a (m+1)th row of pixel circuit 21 is scanned, because the selection signal G1 (*m*) output by the $m^{th}$ stage of second scanning unit GOAL is a high-level signal, the first drive signal S-W1 may be set to be a low-level signal, the first switching transistor T11 is conducted, the second drive signal S-W2 is set to be a high-level signal, and the second switching transistor T12 is cut off. In this case, selection signals G1 received by and selection signals G1 output by the $(m+1)^{th}$ stage of second scanning unit GOA1 to the $(2m-1)^{th}$ stage of second scanning unit GOA1 are all high-level signals. Therefore, the $(m+1)^{th}$ row of pixel circuit 21 and a $(2m-1)^{th}$ row of pixel circuit 21 may be refreshed in sequence.

The third sub-area does not need to be refreshed. When a $2m^{th}$ row of pixel circuit 21 is scanned, both the first drive signal S-W1 and the second drive signal S-W2 are set to be high-level signals, and both the first switching transistor T11 and the second switching transistor T12 are cut off. In this case, the $2m^{th}$ stage of second scanning unit GOAL to the $M^{th}$ stage of second scanning unit GOA1 cannot receive a selection signal, and do not output a selection signal. Therefore, the $2m^{th}$ row of pixel circuit 21 to an $M^{th}$ row of pixel circuit 21 are not refreshed.

As shown in FIG. 16A, for a third frame of image, the first sub-area is not refreshed, and the second sub-area and the third sub-area are refreshed. When the pixel circuit 21 corresponding to the second sub-area is scanned, for a manner of setting the first drive signal S-W1 and the second drive signal S-W2, refer to a manner of setting the first drive signal S-W1 and the second drive signal S-W2 when the pixel circuit 21 corresponding to the second sub-area is scanned in the first frame of image.

As shown in FIG. 16A, a fourth frame of image may be refreshed with reference to a refresh manner of the second frame of image.

It can be learned that a refresh rate of a $1^{st}$ sub-area from top to bottom in the display area depends on the frequency of the column signal G_STV1. When a current sub-area needs to be refreshed, but a previous sub-area of the current sub-area is not refreshed, the first drive signal S-W1 may be first set to be a high-level signal, and the second drive signal S-W2 may be set to be a low-level signal. Then, the first drive signal S-W1 is set to be a low-level signal, and the second drive signal S-W2 is set to be a high-level signal. When a current sub-area does not need to be refreshed, but a previous sub-area is refreshed, both the first drive signal S-W1 and the second drive signal S-W2 may be set to be high-level signals.

It may be understood that, when the first selection circuit 60 outputs G1 (m−1) transmitted by the $(m-1)^{th}$ stage of second scanning unit, the $(m-1)^{th}$ row of pixel circuit 21 corresponding to the $(m-1)^{th}$ stage of second scanning unit GOAL is synchronized with the $m^{th}$ row of pixel circuit 21 corresponding to the $m^{th}$ stage of second scanning unit GOA1. In other words, the $(m-1)^{th}$ row of pixel circuit 21 and the $m^{th}$ row of pixel circuit 21 may be divided into a same area.

Figure 16B:
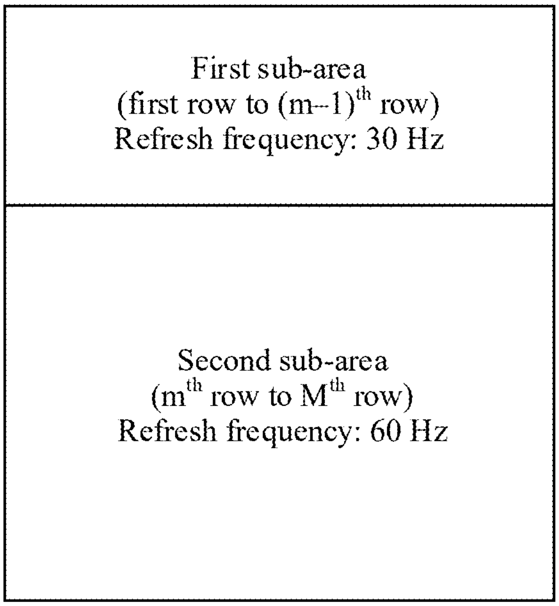
FIG. 16B is a second diagram in which different refresh rates are used in a plurality of different sub-areas.
Figure 16C:
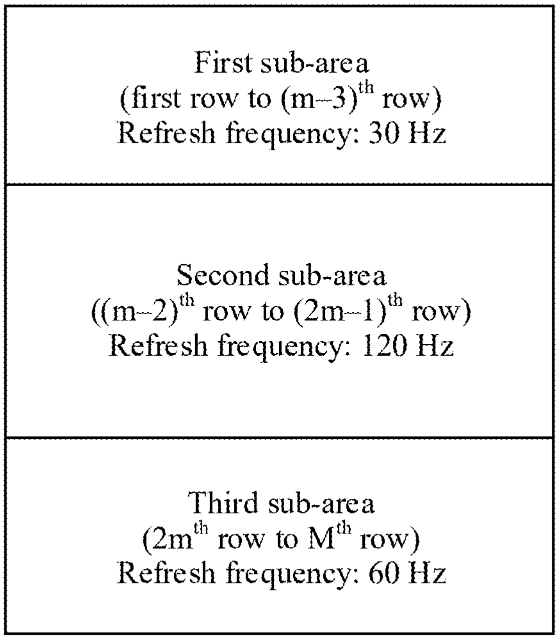
FIG. 16C is a third diagram in which different refresh rates are used in a plurality of different sub-areas.
Figure 16D:
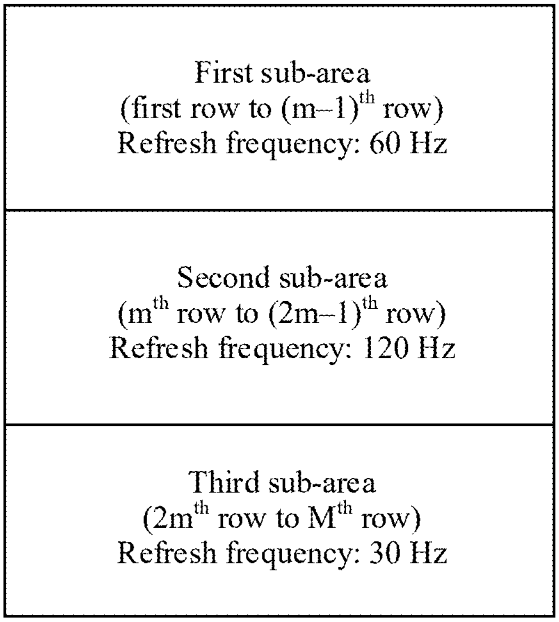
FIG. 16D is a fourth diagram in which different refresh rates are used in a plurality of different sub-areas.

Therefore, a quantity of sub-areas in the display area, a size of each sub-area, and refresh rates of the second sub-area and subsequent sub-areas may be adjusted by controlling a time sequence of the first drive signal S-W1 and the second drive signal S-W2, and the frequency of the column signal E_STV1. In this way, the display area may be divided into a maximum of N+1 sub-areas. Because M-N=1, N+1 is M. In other words, in this implementation, the display may be divided into a maximum of M sub-areas. Alternatively, the display area may be divided into 2 to M sub-areas. For example, as shown in FIG. 16B, the display area may be divided into two sub-areas. As shown in FIG. 16C, the display area may be divided into three sub-areas, but each sub-area includes a different quantity of rows of pixel circuits. Alternatively, as shown in FIG. 16D, after the display area is divided into three sub-areas, refresh rates of the sub-areas are different.

On a game interface, sizes of a static picture and a dynamic picture may be different at different moments. Based on this, a quantity of sub-areas obtained by dividing the display area and a quantity of rows of pixel circuits included in each sub-area are also different. Therefore, this implementation is better applicable to the game scenario, so that a high refresh rate can be implemented on a dynamic area, to improve user experience, and a low refresh rate can be implemented on a static area, to reduce power consumption.

Therefore, different refresh rates can be implemented for different sub-areas. When the display in embodiments of this disclosure is applied to a game scenario, a high refresh rate can be implemented on the dynamic picture in the display area, to improve user experience, and a low refresh rate can be implemented on the static picture in the display area, to reduce power consumption.

In addition, in addition to the foregoing technical solutions, the first selection circuit 60 may further use a signal selector. The signal selector may receive the selection signal EM transmitted by the first scanning unit EOA, and receive the selection signal G1 (m−1) transmitted by the $(m-1)^{th}$ stage of second scanning unit GOA1, and output the selection signal EM, or output the selection signal G1 (*m*), or output no selection signal.

Figure 17:
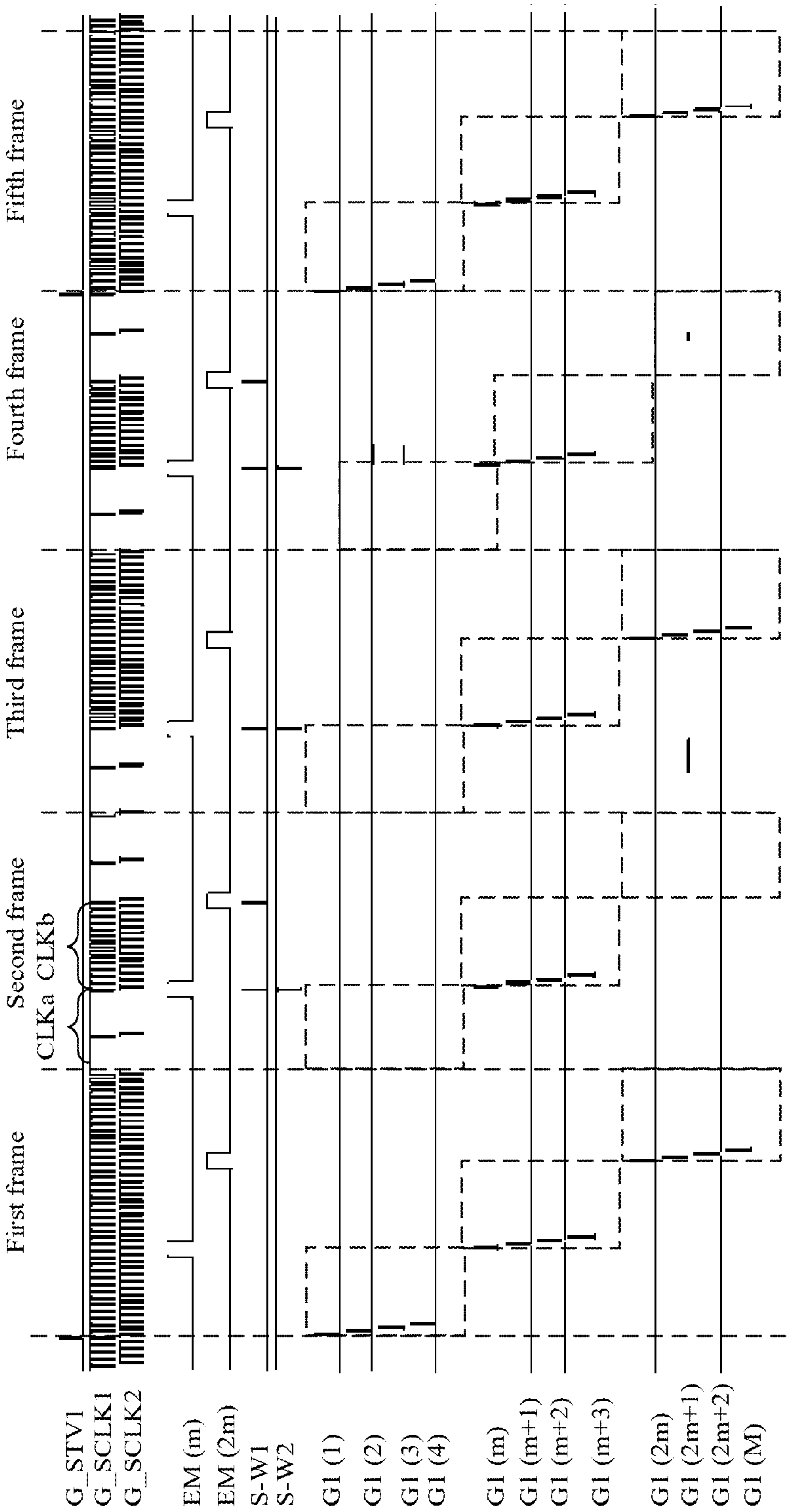
FIG. 17 is a second time sequence diagram corresponding to the scanning drive circuit shown in FIG. 13A.

To further reduce power consumption, as shown in FIG. 17, a first clock signal G_CLK1 may include a first clock signal CLKa and a second clock signal CLKb. The first clock signal CLKa is sent to the scanning drive circuit 30 by the displaying drive circuit 40 in FIG. 1 when the output end of the second scanning unit GOAL outputs a low-level signal. The second clock signal CLKb is sent to the scanning drive circuit 30 by the displaying drive circuit 40 in FIG. 1 when the output end of the second scanning unit GOAL outputs a high-level signal, and a frequency of the first clock signal CLKa is less than a frequency of the second clock signal. When a row of pixel circuit 21 needs to be driven, a second scanning unit GOAL corresponding to the row of pixel circuit 21 outputs a high-level signal. When a row of pixel circuit 21 does not need to be driven, a second scanning unit GOAL corresponding to the row of pixel circuit 21 outputs a low-level signal. In other words, when the second scanning unit GOA1 outputs a low-level signal, it indicates that a row of pixel circuit 21 corresponding to the second scanning unit GOAL does not need to be driven. Because a frequency of a clock signal is usually the same as a row scanning frequency of a pixel circuit 21, when the second scanning unit GOAL outputs a low-level signal, the frequency of the clock signal may be reduced. In other words, the frequency of the first clock signal CLKa sent by the displaying drive circuit 40 when the second scanning unit GOAL outputs a low-level signal is less than the frequency of the second clock signal CLKb sent by the displaying drive circuit when the second scanning unit GOAL outputs a high-level signal, so that power consumption is reduced.

Figure 18:
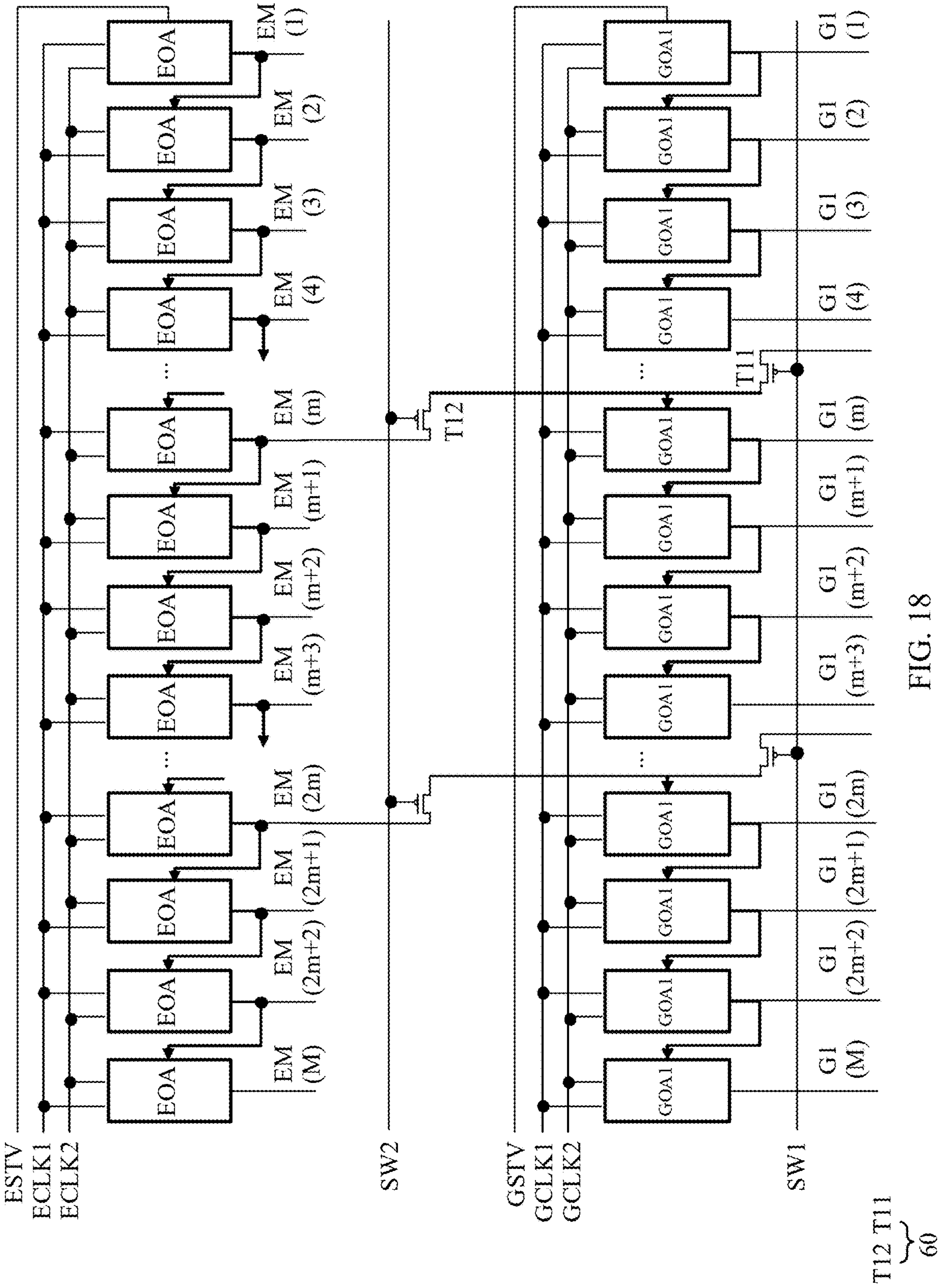
FIG. 18 is a diagram of a structure of a scanning drive circuit according to a second embodiment of this disclosure.

It may be understood that, as shown in FIG. 17, in an entire process of displaying each frame of image, the displaying drive circuit 40 always sends a clock signal to the scanning drive circuit 30, the clock signal includes a first clock signal E_CLK2 sent to the first clock signal end ECLK1, a second clock signal E_CLK2 sent to the second clock signal end ECLK2, a first clock signal G_CLK1 sent to the first clock signal end GCLK1, and a second clock signal G_CLK2 sent to the second clock signal end GCLK2. Based on a same reason that the first clock signal G_CLK1 includes the first clock signal CLKa and the second clock signal CLKb, the first clock signal E_CLK1, the second clock signal E_CLK2, and the second clock signal G_CLK2 may respectively include a first clock signal CLKa and a second clock signal CLKb. For example, as shown in FIG. 18, when the second frame of image is displayed, the first sub-area and the second sub-area are not refreshed, and selection signals output by the first stage of second scanning units GOAL to the $(m-1)^{th}$ stage of second scanning units GOA1 and the $2m^{th}$ of second scanning units GOAL to the $M^{th}$ stage of second scanning units GOA1 are all low-level signals. Therefore, frequencies of clock signals sent by the first clock signal end ECLK1, the second clock signal end ECLK2, and the first clock signal end GCLK1 and the second clock signal end GCLK2 in the second scanning unit GOA1 in this time period may be reduced.

In addition, in some other possible implementations, the second clock signal G_CLK2 may be a direct current signal. Compared with a pulse signal having a specific frequency, the direct current signal has lower power consumption. Therefore, power consumption can be further reduced in this solution.

In another embodiment of this disclosure, as shown in FIG. 18, a difference from the embodiment shown in FIG. 13B lies in a relationship between a quantity M of first scanning units EOA and a quantity N of first selection circuits 60. In the embodiment shown in FIG. 13B, M−N=1. In this embodiment, M−N>1. First input ends of the N first selection circuits 60 are respectively correspondingly connected to N stages of first scanning units, second input ends of the N first selection circuits 60 are further respectively correspondingly connected to N stages of second scanning units GOA1, and output ends of the N first selection circuits 60 are further respectively correspondingly connected to N stages of second scanning units GOA1. For example, as shown in FIG. 18, this embodiment is described by using an example in which N=2. A first input end of one first selection circuit 60 is connected to an output end of an $m^{th}$ stage of first scanning unit EOA, a second input end is connected to an output end of an $(m-1)^{th}$ stage of second scanning unit GOA1, and an output end of the first selection circuit 60 is connected to an input end of an $m^{th}$ stage of second scanning unit GOA1. A first input end of another first selection circuit 60 is connected to an output end of a $2m^{th}$ stage of first scanning unit EOA, a second input end is connected to an output end of a $(2m-1)^{th}$ stage of second scanning unit GOA1, and an output end of the first selection circuit 60 is connected to an input end of a $(2m-1)^{th}$ stage second scanning unit GOA1.

In this embodiment, when the quantity of the first selection circuits 60 is N, a maximum quantity of sub-areas into which the display area may be divided may be N+1. In other words, the quantity of sub-areas into which the display area may be divided may be N+1, or may be N or less than N. For example, when there are two first selection circuits 60, the display may be divided into a maximum of three sub-areas. Based on a same principle as that when there is one first selection circuit 60, when the display area is divided into N+1 sub-areas, different refresh rates of the N+1 sub-areas may also be implemented. In this way, more areas can be obtained, to be better applicable to a scenario in which a game interface is refreshed.

Figure 19:
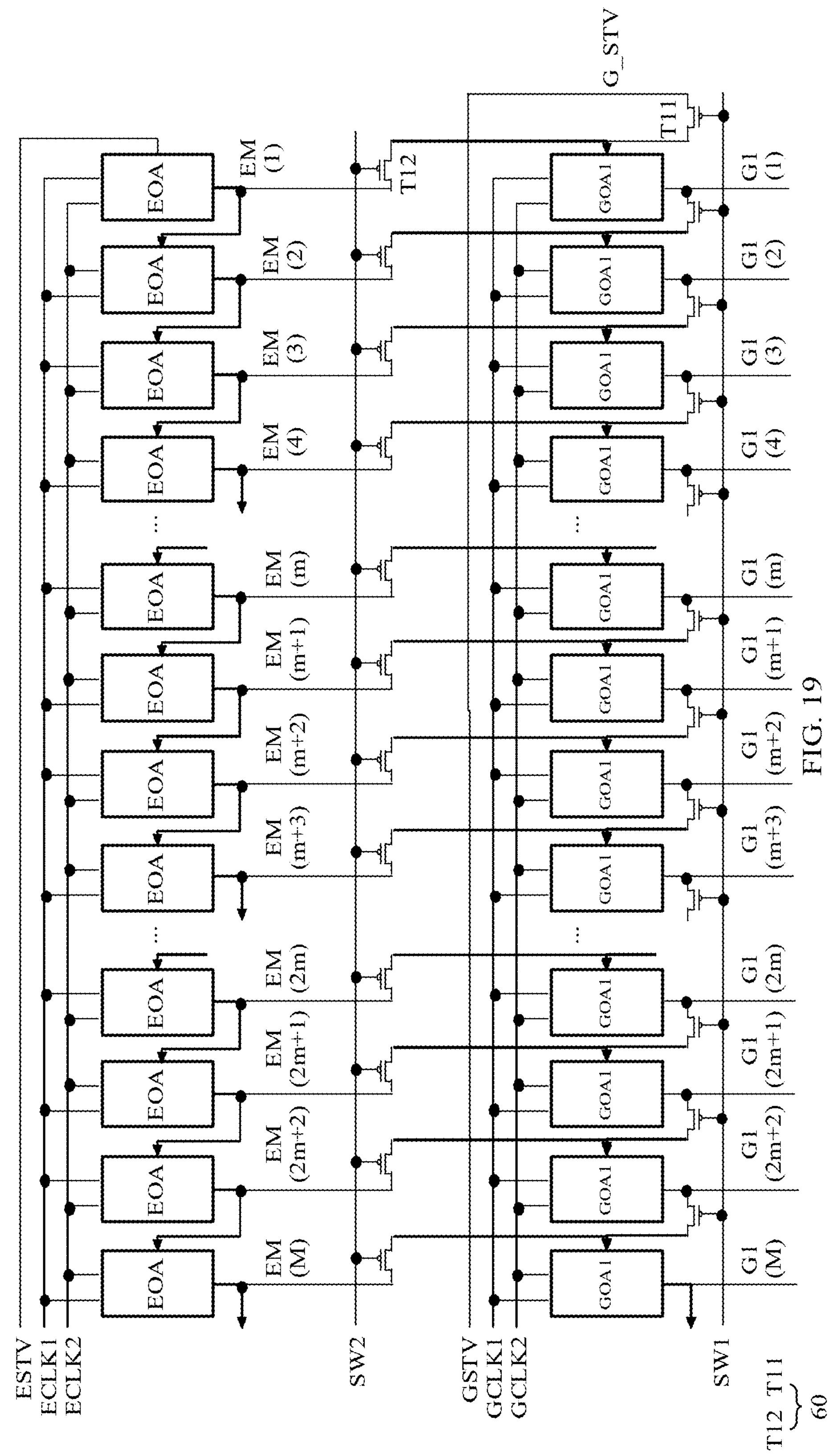
FIG. 19 is a diagram of a structure of a scanning drive circuit according to a third embodiment of this disclosure.

In another embodiment of this disclosure, as shown in FIG. 19, a difference from the embodiment shown in FIG. 13B lies in a relationship between a quantity M of first scanning units EOA and a quantity N of first selection circuits. In the embodiment shown in FIG. 13B, M−N=1. In this embodiment, M=N. In other words, quantities of first scanning units EOA, second scanning units GOA1, and first selection circuit 60 are the same. A first input end of a first selection circuit 60 is connected to an output end of a first stage of first scanning unit EOA, a second input end of the first selection circuit 60 is connected to a first column start signal input end GSTV, and an output end of the first selection circuit 60 is connected to an input end of a first stage of second scanning unit GOA1. Except the first stage of second scanning unit GOA1, an input end of another stage of second scanning unit GOAL is connected to an output end of a previous stage of second scanning unit GOA1 and an output end of the first scanning unit EOA through the first selection circuit 60. In this case, the first selection circuit 60 connected to the first stage of first scanning unit EOA may choose to output a selection signal EM (1) transmitted by the first stage of first scanning unit EOA or a column start signal G_STV transmitted by the first column start signal input end GSTV to the first stage of second scanning unit GOA1, or not to transmit a selection signal to the first stage of second scanning unit GOA1.

Figure 20:
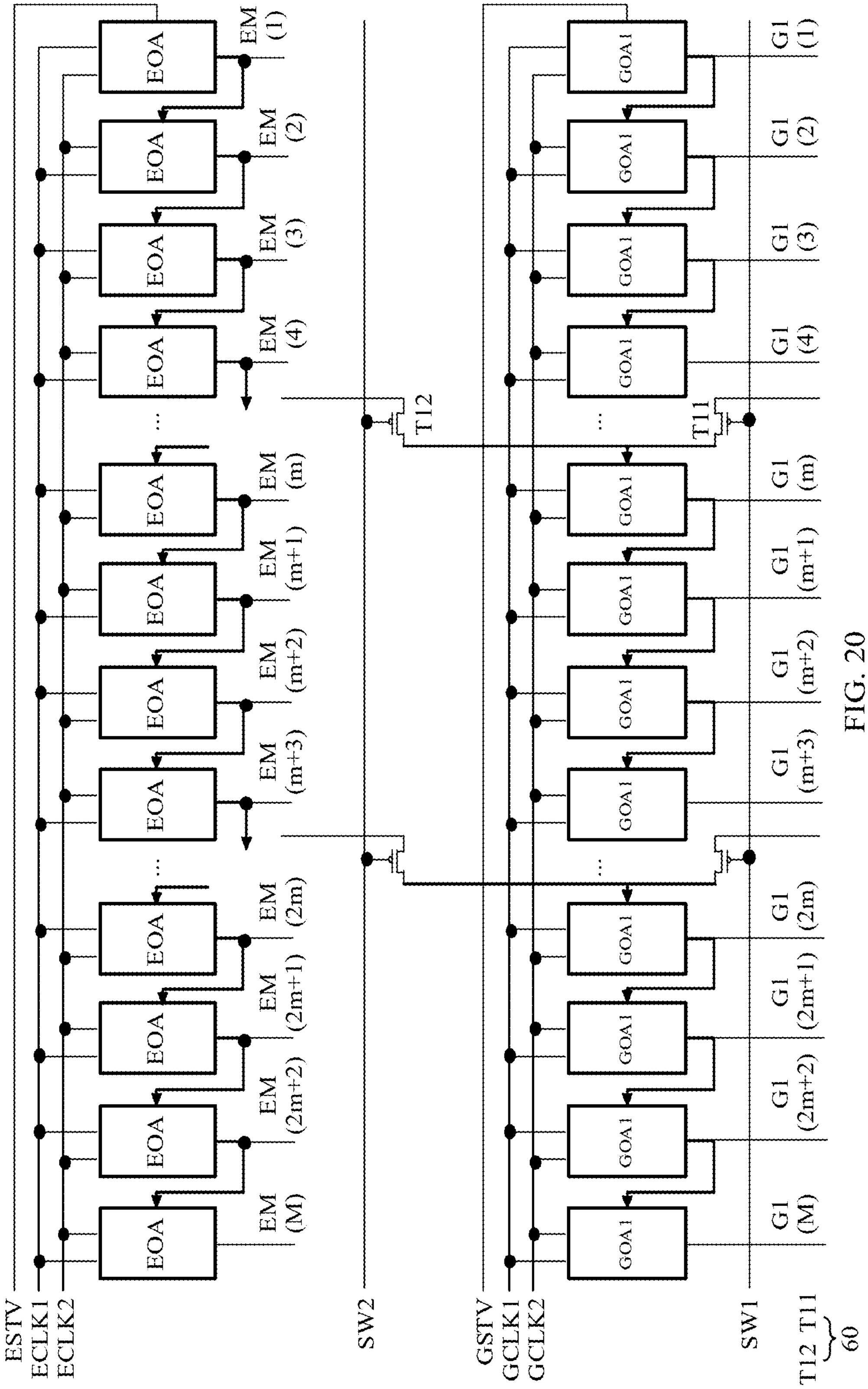
FIG. 20 is a diagram of a structure of a scanning drive circuit according to a fourth embodiment of this disclosure.
Figure 24:
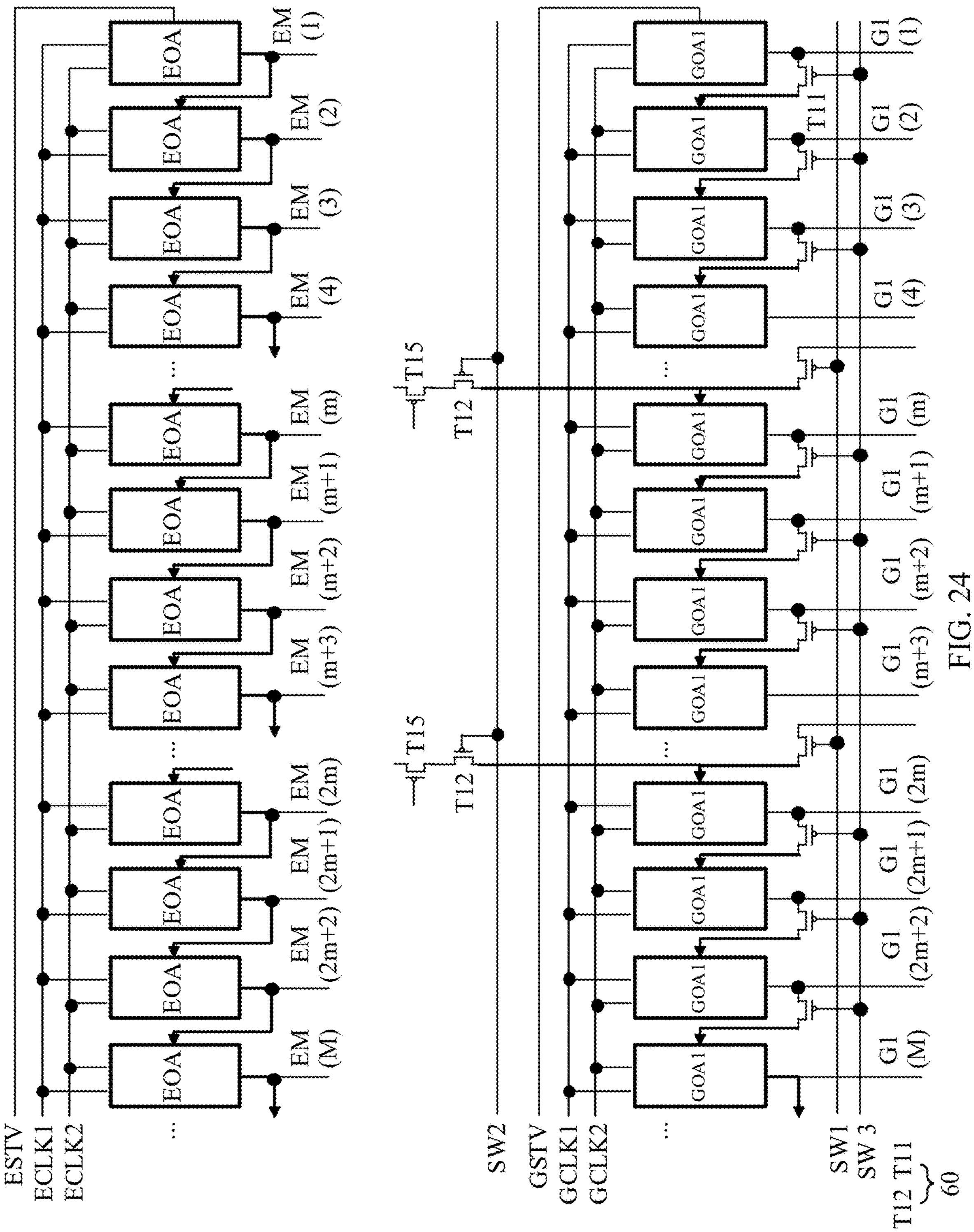
FIG. 24 is a diagram of a structure of a scanning drive circuit according to a seventh embodiment of this disclosure.

In another embodiment of this disclosure, as shown in FIG. 20, a difference from the embodiment shown in FIG. 17 lies in a first scanning unit EOA connected to the first input end of the first selection circuit 60. As shown in FIG. 17, a first selection circuit connected to an output end of an $(m-1)^{th}$ stage of second scanning unit GOAL is connected to an $m^{th}$ stage of first scanning unit EOA. In this embodiment, a first input end of a first selection circuit 60 connected to the output end of the $(m-1)^{th}$ stage of second scanning unit GOAL is connected to an output end of an $(m-r)^{th}$ of first scanning unit EOA or an $(m+r)^{th}$ stage of first scanning unit EOA, where r≤5. For example, as shown in FIG. 20, a first input end of the first selection circuit 60 is connected to an output end of an $(m-1)^{th}$ stage of first scanning unit EOA, or a first input end of the first selection circuit 60 is connected to an output end of an $(m+1)^{th}$ stage of first scanning unit EOA. During actual application, selection signals output by two adjacent stages of first scanning units EOA overlap. For example, as shown in FIG. 24, when an $m^{th}$ row of pixel circuit is scanned, the $m^{th}$ stage of first scanning unit EOA outputs a high-level signal, and the $(m+1)^{th}$ stage of first scanning unit EOA outputs a low-level signal. When the $(m+1)^{th}$ row of pixel circuit is scanned, the $(m+1)^{th}$ stage of first scanning unit EOA outputs a high-level signal, and the $m^{th}$ stage of first scanning unit EOA also outputs a high-level signal. In this case, the selection signal EM (m) output by the $m^{th}$ stage of first scanning unit EOA overlaps the selection signal EM (m+1) output by the $(m+1)^{th}$ stage of first scanning unit. When the $m^{th}$ row of pixel circuit is scanned, the first input end of the first selection circuit 60 is connected to the output end of the $(m-1)^{th}$ stage of first scanning unit EOA. Because the $(m-1)^{th}$ stage of first scanning unit EOA outputs the high-level signal, the first selection circuit 60 receives the high-level signal transmitted by the first scanning unit EOA and sends the high-level signal to the $m^{th}$ stage of second scanning unit GOA1. Therefore, the $m^{th}$ stage of second scanning unit GOA1 may also output the high-level signal, to drive the $m^{th}$ row of pixel circuit.

Figure 21:
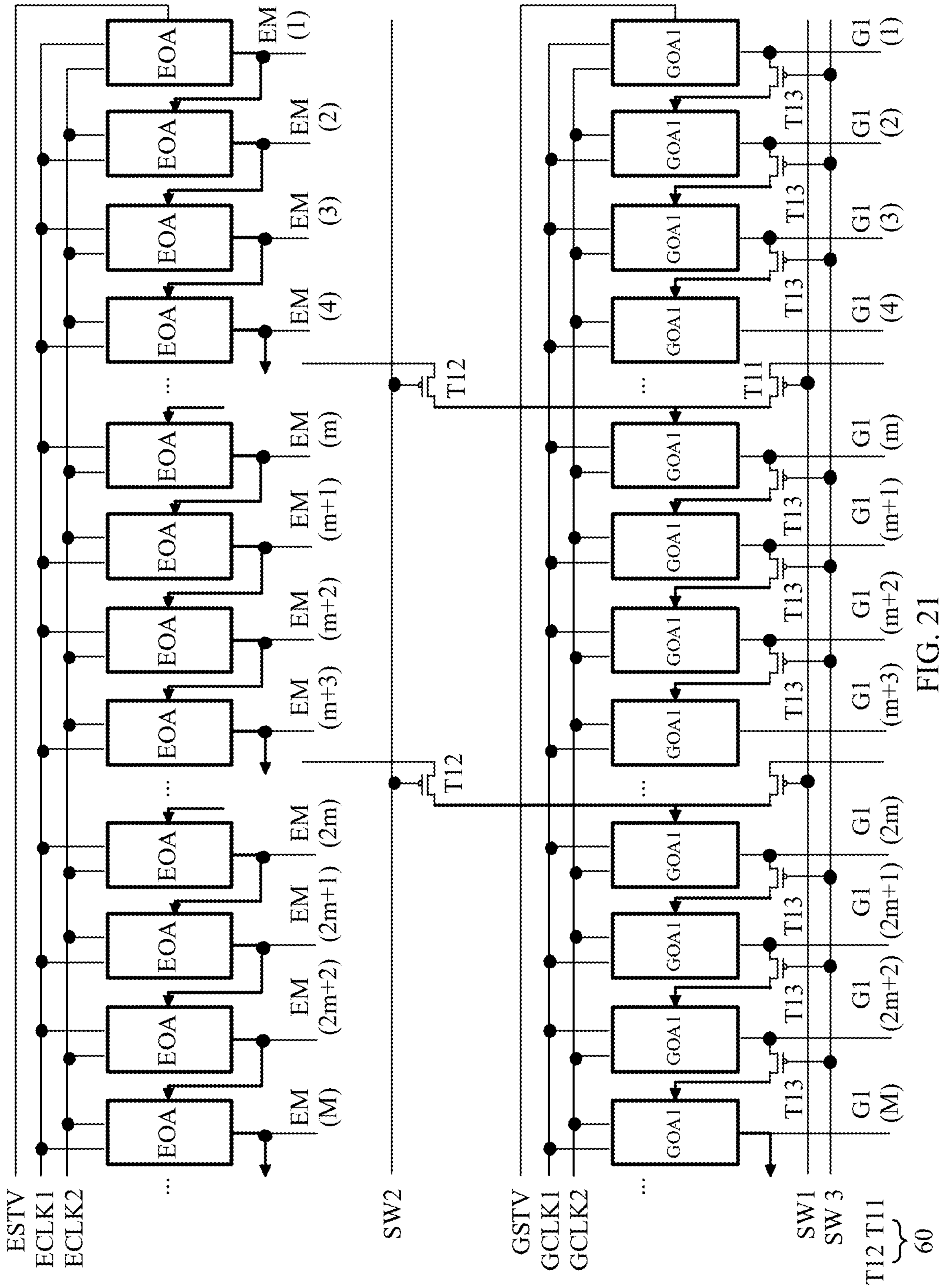
FIG. 21 is a diagram of a structure of a scanning drive circuit according to a fifth embodiment of this disclosure.

In another embodiment of this disclosure, as shown in FIG. 21, a difference from the embodiment shown in FIG. 17 lies in that a third switching transistor T13 and a third drive signal input end SW 3 are added in this embodiment on a basis of the embodiment shown in FIG. 17.

When M−N>1, that is, a difference between a quantity of second scanning units GOA1 and a quantity of first selection circuits 60 is greater than 1, in a plurality of stages of second scanning units GOA1, input ends of some second scanning units GOA1 are connected to the first selection circuit 60, and input ends of other second scanning units GOAL are not connected to the first selection circuit 60. For example, an input end of an $m^{th}$ stage of second scanning unit GOA1 is connected to the first selection circuit 60, but an output end of the $m^{th}$ stage of second scanning unit GOA1 is not connected to the first selection circuit 60. In other words, the first selection circuit 60 is not connected between the output end of the $m^{th}$ stage of second scanning unit GOA1 and an input end of an $(m+1)^{th}$ stage of second scanning unit GOA1. Therefore, a pulse voltage of a selection signal G1 (*m*) output by the output end of the $m^{th}$ stage of second scanning unit GOA1 is lower than a pulse voltage of a selection signal G1 (m+1) output by the $(m+1)^{th}$ stage of second scanning unit GOA1. This causes a delay of the selection signal G1 (m+1) output by the $(m+1)^{th}$ stage of second scanning unit GOA1 to be different from a delay of the selection signal G1 (*m*) output by the $m^{th}$ stage of second scanning unit GOA1, and consequently causes a linear mura (mura) defect, that is, a stain or color difference on the display.

Based on this, as shown in FIG. 21, in this embodiment, a quantity of third switching transistors T13 is L, and K is an integer greater than or equal to 1. In other words, K is one or more. For example, when K=1, a first electrode of the third switching transistor T13 is connected to an output end of an $m^{th}$ stage of second scanning unit GOA1, a second electrode of the third switching transistor T13 is connected to an input end of an $(m+1)^{th}$ stage of second scanning unit GOA1, and a control electrode of the third switching transistor T13 is connected to a third drive signal input end SW 3.

The third drive signal input end SW 3 is connected to the displaying drive circuit 40 shown in FIG. 1, and the displaying drive circuit 40 is configured to send a low-level signal to the third drive signal input end SW 3. Because the third drive signal input end SW 3 is connected to the control electrode of the third switching transistor T13, when the third switching transistor T13 is a P-type transistor, after the displaying drive circuit 40 sends the low-level signal to the third drive signal input end SW 3, the control electrode of the third switching transistor T13 may receive the low-level signal, and the third switching transistor T13 is conducted. A selection signal may be transmitted, through the third switching transistor T13, between two stages of second scanning units GOA1 connected through the third switching transistor T13. In this way, a pulse voltage of a selection signal G1 output by an output end of each stage of second scanning unit GOA1 may be the same as a pulse voltage of a selection signal G1 output by an output end of another stage of second scanning unit GOA1, to better reduce occurrence of a linear mura defect.

In an optional implementation, K>1, and a difference between M and K+N is greater than 1. In another optional implementation, as shown in FIG. 21, K>1, and a difference between M and K+N is 1. An output end of each second scanning unit GOAL in the first stage of second scanning unit GOA1 to the $(M-1)^{th}$ stage of second scanning unit GOAL is connected to the third switching transistor T13 or the first selection circuit 60. In other words, a third switching transistor T13 or a first selection circuit 60 is connected between the output end of the first stage of second scanning unit GOA1 and an input end of a second stage of second scanning unit GOA1, a third switching transistor T13 or a first selection circuit 60 is connected between an output end of the second stage of second scanning unit GOA1 and an input end of a third stage of second scanning unit GOA1, and the rest may be deduced by analogy. In this way, a pulse voltage of a selection signal output by an output end of each stage of second scanning unit GOAL is the same as a pulse voltage of a selection signal output by an output end of another stage of second scanning unit GOA1, to better reduce occurrence of a linear mura defect.

Figure 22:
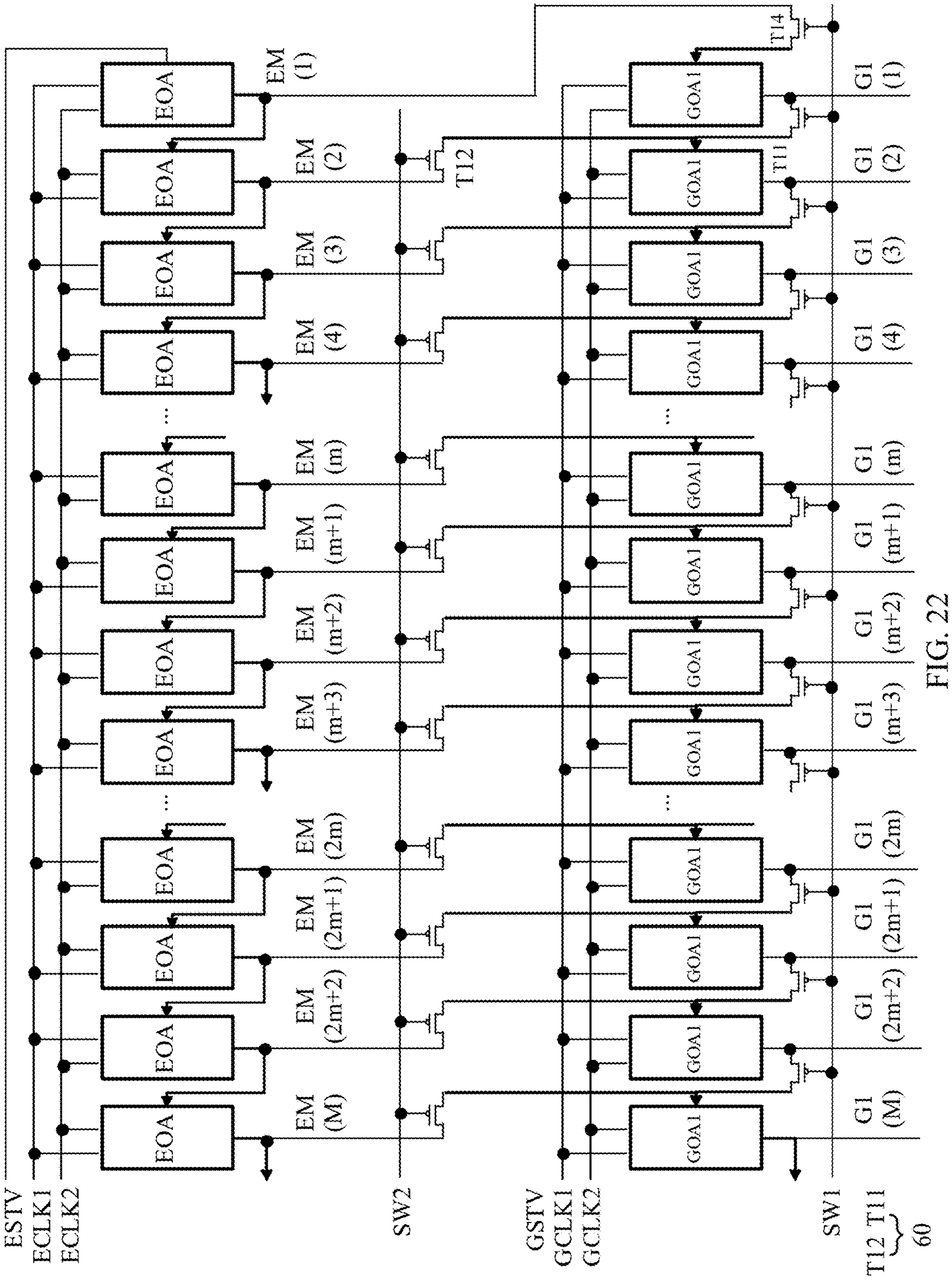
FIG. 22 is a diagram of a structure of a scanning drive circuit according to a sixth embodiment of this disclosure.

In another embodiment of this disclosure, as shown in FIG. 22, a difference from the embodiment shown in FIG. 13B lies in that a fourth switching transistor T14 is added in this embodiment on a basis of the embodiment shown in FIG. 13B. As shown in FIG. 22, a first electrode of the fourth switching transistor T14 is connected to an output end of any stage of first scanning unit EOA, a second electrode of the fourth switching transistor T14 is connected to an input end of a first stage of second scanning unit GOA1, and a control electrode of the fourth switching transistor is connected to a fourth drive signal input end SW 4. In this way, a frequency of a selection signal G1 (1) output by the first stage of second scanning unit GOA1 may be adjusted through conduction and cut-off of the fourth switching transistor T14, that is, a frequency of a $1^{st}$ sub-area from top to bottom in the display area may be adjusted. In this implementation, the fourth switching transistor T14 may be a P-type transistor or an N-type transistor. Herein, an example in which the fourth switching transistor T14 is a P-type transistor is used for description. When a low-level signal is transmitted to the control electrode of the fourth switching transistor T14, the fourth switching transistor T14 is conducted, and a selection signal EM output by any stage of first scanning unit EOA may be transmitted to the first stage of second scanning unit GOA1 through the fourth switching transistor T14. When the fourth switching transistor T14 is always in a conducted state, a frequency of a selection signal G1 (1) output by the first stage of second scanning unit GOAL is the same as a frequency of a selection signal EM output by any stage of first scanning unit EOA. If the frequency of the selection signal G1 (1) output by the first stage of second scanning unit GOA1 needs to be lower than the frequency of the selection signal EM output by any stage of first scanning unit EOA, when the selection signal EM output by any stage of first scanning unit EOA is a high-level signal, the high-level signal may be transmitted to the control electrode of the fourth switching transistor T14, the fourth switching transistor is cut off, and the first stage of second scanning unit GOA1 does not output a selection signal. In this way, it can be implemented that the frequency of the selection signal G1 (1) output by the first stage of second scanning unit GOAL is lower than the frequency of the selection signal EM of any stage of first scanning unit EOA, so that the frequency of the selection signal G1 (1) output by the first stage of second scanning unit GOA1 is adjusted, and a refresh rate of the $1^{st}$ sub-area of the display area is adjusted.

In addition, in an example, when selection signals EMs output by two adjacent stages of first scanning units EOA do not overlap, the first electrode of the fourth switching transistor T14 is connected to the output end of the first stage of first scanning unit GOA1. When the first row of pixel circuit is scanned, the selection signal EM (1) output by the first stage of first scanning unit EOA is a high-level signal. Therefore, when the first electrode of the fourth switching transistor T14 is connected to the output end of the first stage of first scanning unit EOA, and the fourth switching transistor T14 is conducted, the high-level signal output by the first stage of first scanning unit EOA may be transmitted to the first stage of first scanning unit EOA through the fourth switching transistor T14, and the EM (1) output by the first stage of first scanning unit EOA is also a high-level signal, so that the first row of pixel circuit can be driven.

In another example, when selection signals EMs output by two adjacent stages of first scanning units EOA overlap, the first electrode of the fourth switching transistor T14 may further be connected to the output end of the second stage of first scanning unit EOA or the third stage of first scanning unit EOA.

Figure 23:
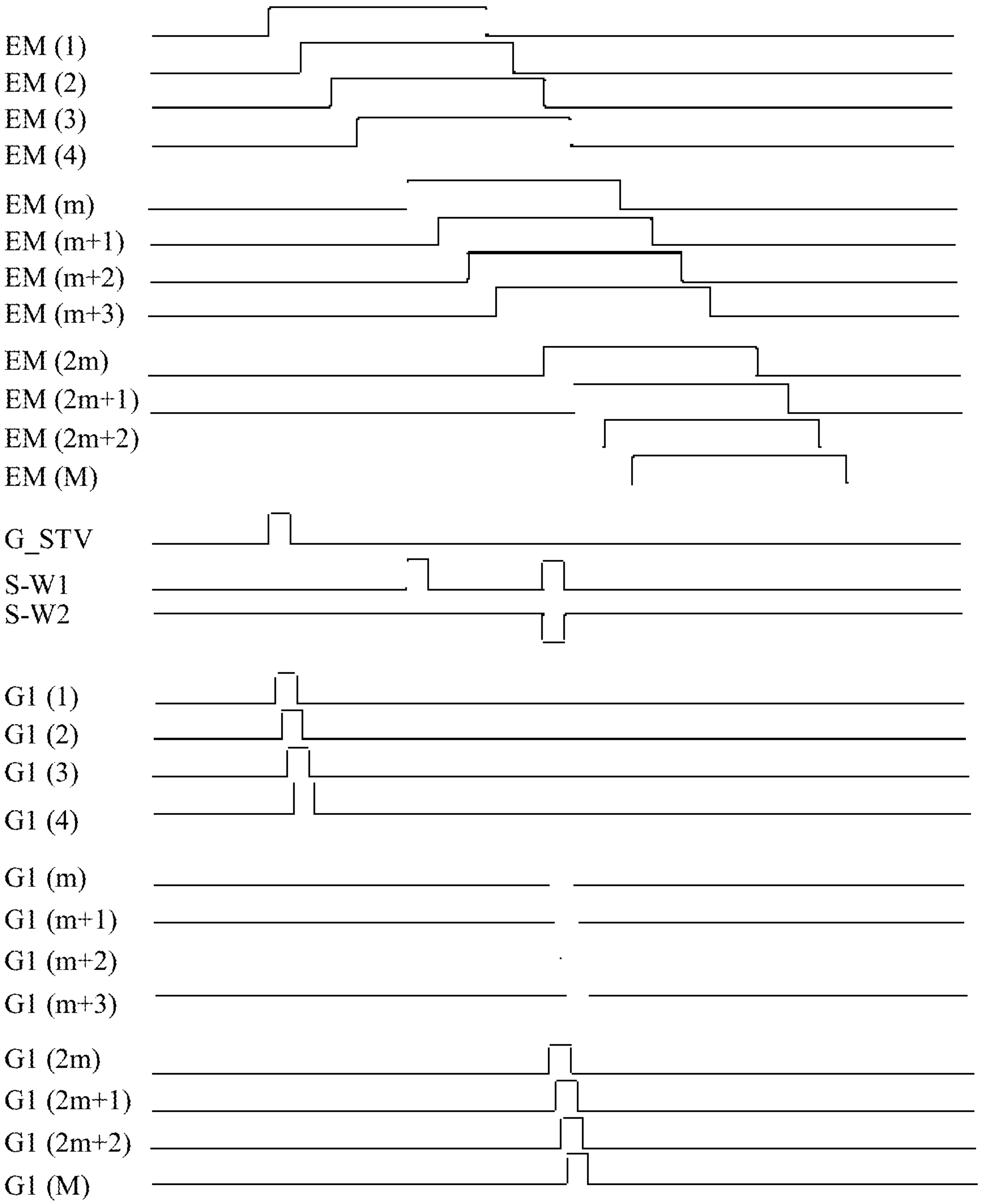
FIG. 23 is a corresponding time sequence diagram when selection signals output by two adjacent stages of first scanning units overlap.

As shown in FIG. 23, when selection signals EMs output by two adjacent stages of first scanning units EOA overlap, and a $2m^{th}$ row of pixel circuit is scanned, because the selection signal EM (m) output by the $m^{th}$ stage of first scanning unit is also at a high level, the first selection circuit 60 is also connected between the $(m-1)^{th}$ stage of first scanning unit EOA and the $m^{th}$ stage of second scanning unit GOA1, and an input signal of the $m^{th}$ stage of second scanning unit GOA1 is also a high-level signal, the selection signal G1 (*m*) output by the $m^{th}$ stage of second scanning unit GOA1 is a high-level signal, the $m^{th}$ row of pixel circuit is also driven. As a result, the scanning drive circuit works abnormally.

Based on this, in another embodiment of this disclosure, as shown in FIG. 24, a difference from the embodiment shown in FIG. 21 lies in that a fifth switching transistor T15 is added in this embodiment on a basis of the embodiment shown in FIG. 21. The embodiment shown in FIG. 21 may be applied to a scenario in which selection signals EMs output by two stages of first scanning units EOA do not overlap. As shown in FIG. 23, the scanning drive circuit 30 in this embodiment may be applied to a scenario in which selection signals EMs output by two stages of first scanning units EOA overlap.

Figure 25:
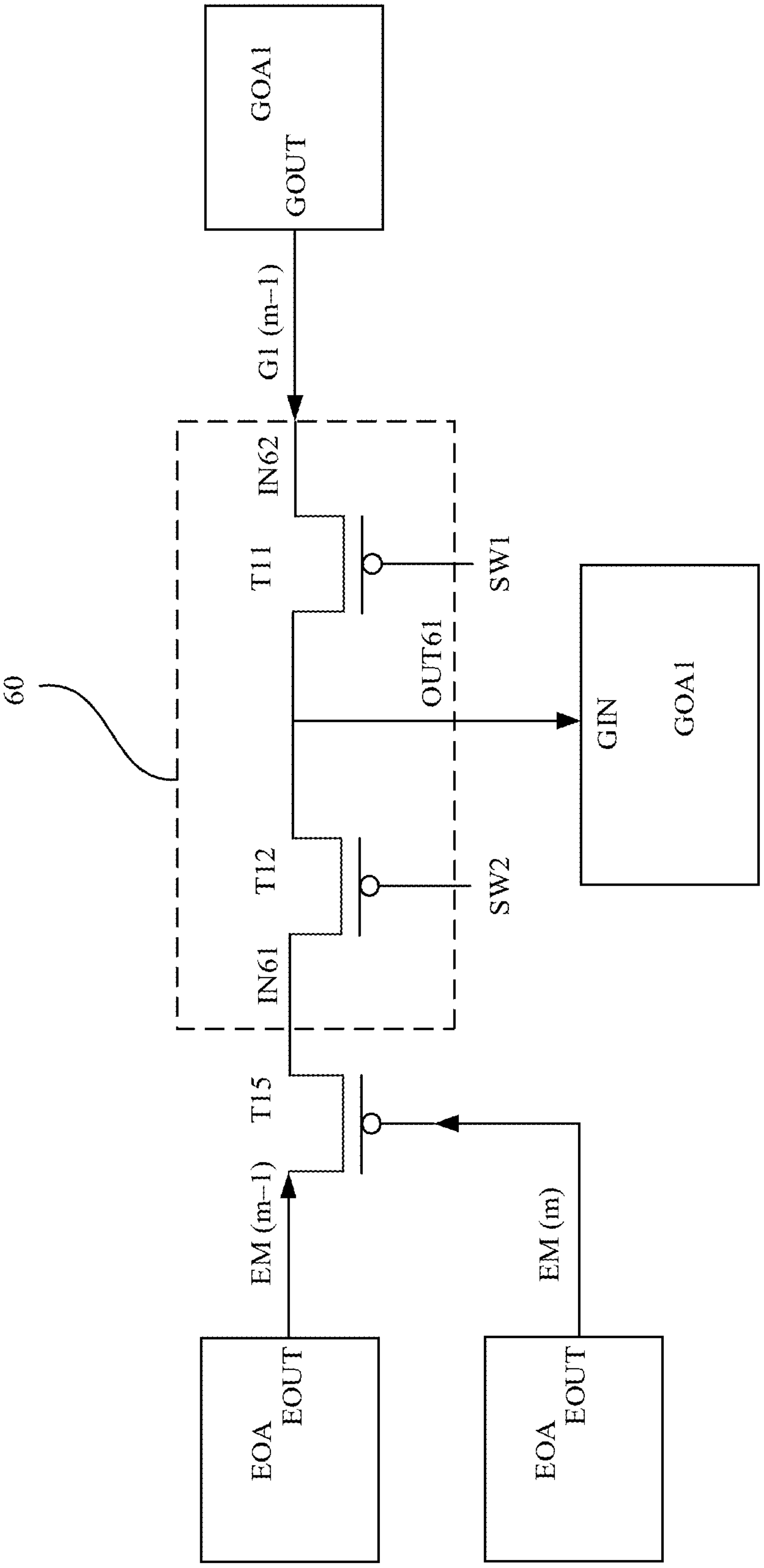
FIG. 25 is a diagram of a connection relationship between an (m−1)th stage of first scanning unit, an $m^{th}$ stage of first scanning unit, an (m−1)th stage of second scanning unit, an $m^{th}$ stage of second scanning unit, a fifth switching transistor, and a first selection circuit in FIG. 23.

A second electrode of the fifth switching transistor T15 is connected to a first input end of the first selection circuit 60, a first electrode of the fifth switching transistor T15 is connected to an output end of a $p^{th}$ stage of first scanning unit EOA, and a control electrode of the fifth switching transistor T15 is connected to an output end of a $(p+q)^{th}$ stage of first scanning unit EOA, where both p and q are integers greater than or equal to 1. In this embodiment, p=m−1, and q=1. In other words, as shown in FIG. 25, the first electrode of the fifth switching transistor T15 is connected to an output end EOUT of an $(m-1)^{th}$ stage of first scanning unit EOA, and the control electrode of the fifth switching transistor T15 is connected to an output end EOUT of an $m^{th}$ stage of first scanning unit EOA. The second electrode of the fifth switching transistor T15 is connected to an output end GOUT of an $(m-1)^{th}$ stage of second scanning unit GOA1 through the first selection circuit 60, and an output end OUT61 of the first selection circuit 60 is connected to an input end GIN of an $m^{th}$ stage of second scanning unit GOA1.

Figure 26:
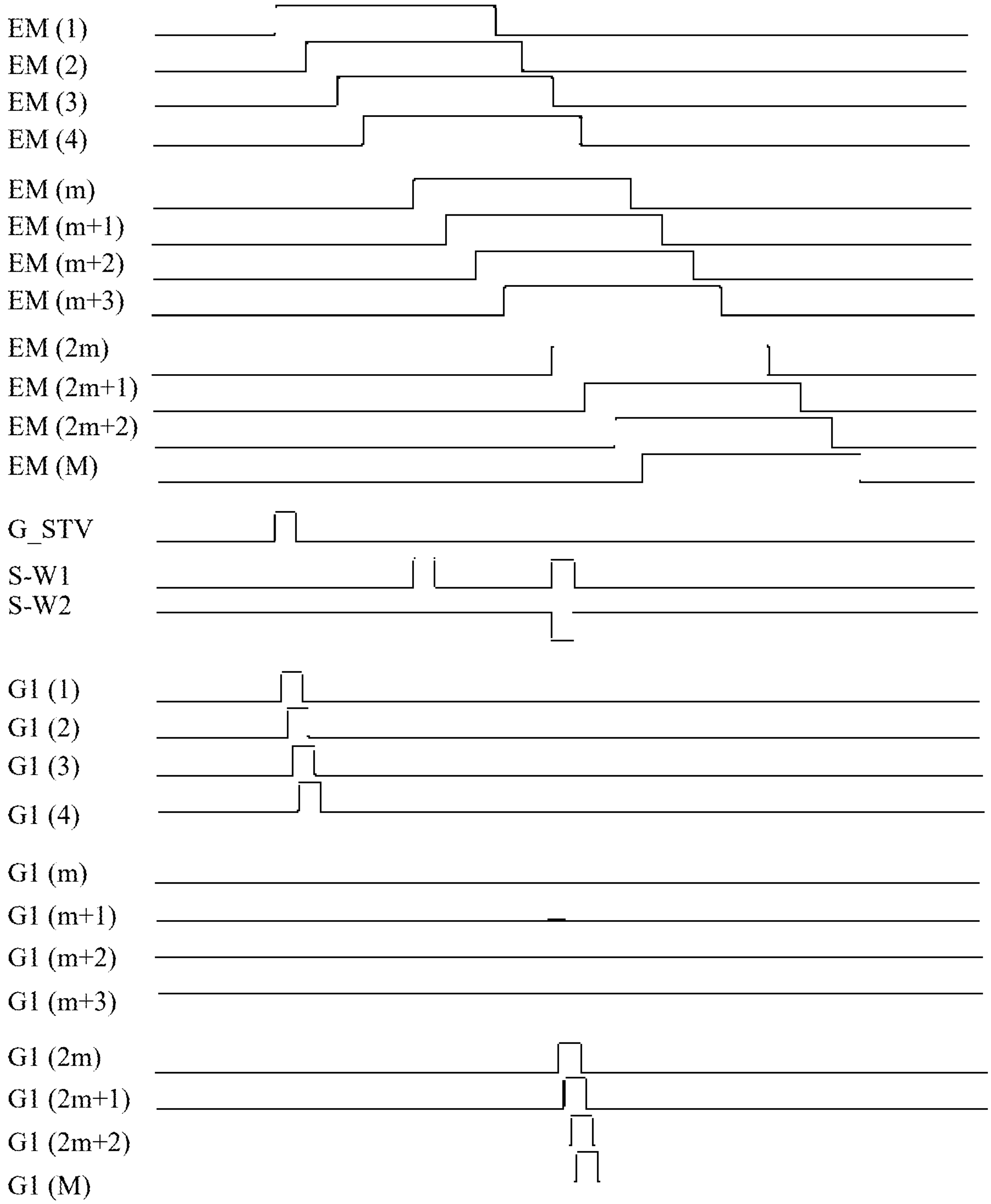
FIG. 26 is a sequence diagram corresponding to the scanning drive circuit shown in FIG. 23.

When the fifth switching transistor T15 is a P-type transistor, as shown in FIG. 26, when a $2m^{th}$ stage of first scanning unit EOA receives a selection signal EM (2*m*-1) transmitted by a $(2m-1)^{th}$ stage of first scanning unit EOA, the first drive signal S-W1 is set to be a high-level signal, and the second drive signal S-W2 is set to be a low-level signal. The $(2m-1)^{th}$ stage of first scanning unit EOA transmits a selection signal EM (2*m*) to the $2m^{th}$ stage of second scanning unit GOA1 through the first selection circuit 60. In this case, the selection signal EM (2*m*) is a high-level signal. Therefore, the selection signal G1 (2*m*) output by the $2m^{th}$ stage of second scanning unit is also a high-level signal. Because the control electrode of the fifth switching transistor T15 is connected to the output end of the $(m-1)^{th}$ first scanning unit EOA, when selection signals EMs output by the $m^{th}$ first scanning unit EOA and the $(m+1)^{th}$ first scanning unit EOA are both high-level signals, the fifth switching transistor T15 is cut off. Therefore, the high-level signal output by the $(m-1)^{th}$ first scanning unit EOA cannot be transmitted to the $m^{th}$ second scanning unit GOA1, and no signal is output by the second scanning unit GOA1, to reduce a case in which the drive circuit works abnormally.

As shown in FIG. 25, there are one or more fifth switching transistors T15. When there are a plurality of fifth switching transistors T15, a quantity of the fifth switching transistors T15 is the same as a quantity of the first selection circuits 60, and a second electrode of each fifth switching transistor T15 is correspondingly connected to the first input end of each first selection circuit 60. In this way, each first selection circuit 60 is connected to one fifth switching transistor T15, so that a case in which a circuit works abnormally at a position in which each first selection circuit 60 is located can be reduced, and operating accuracy of the scanning drive circuit is further improved.

In another embodiment, p=m−2, and q=2, 3, 4, or the like. There are a plurality of fifth switching transistors T15, and a quantity of fifth switching transistors T15 is less than a quantity of first selection circuits 60.

Figure 27:
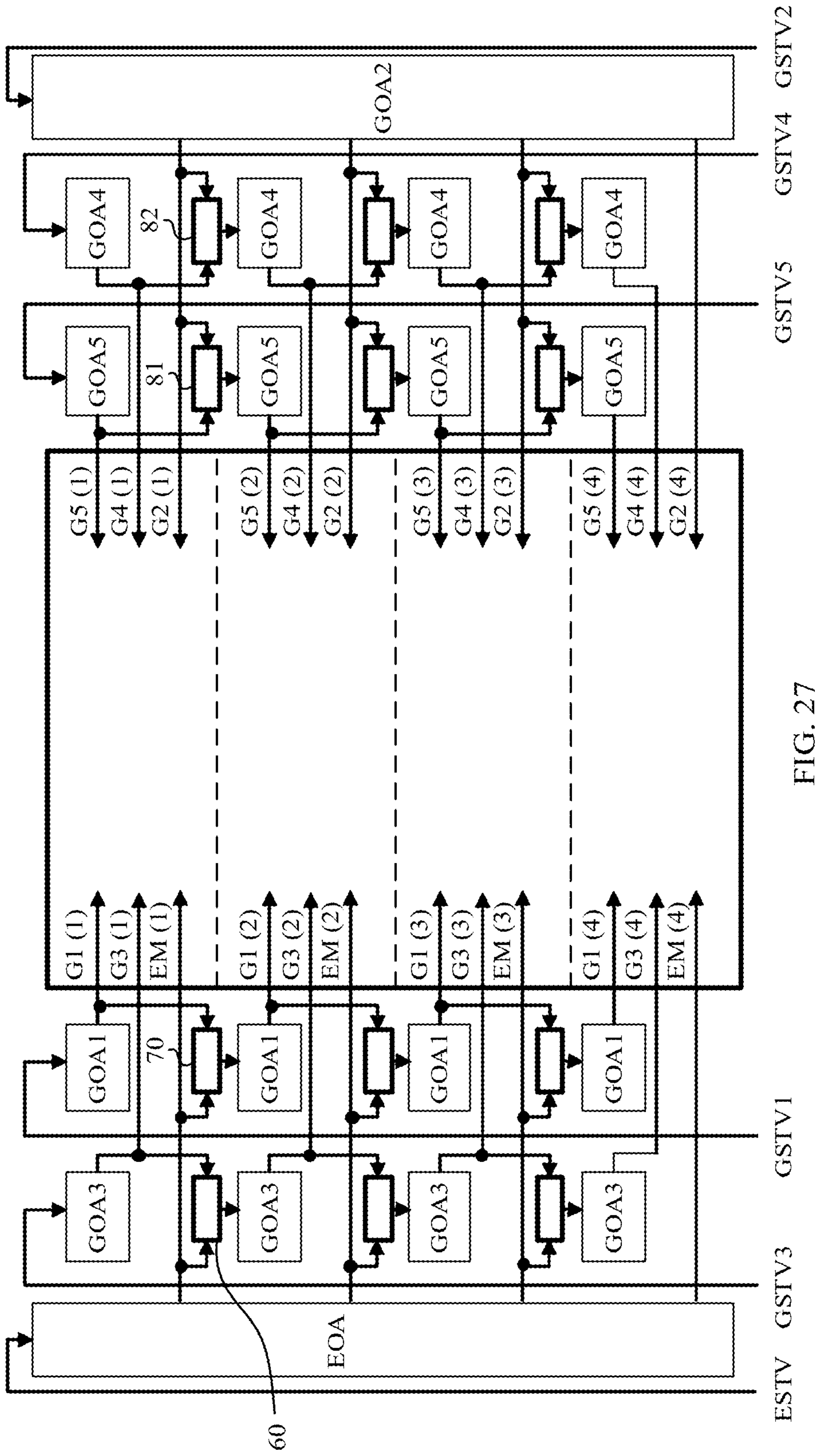
FIG. 27 is a diagram of a structure of a scanning drive circuit according to an eighth embodiment of this disclosure.

In another embodiment of this disclosure, as shown in FIG. 27, a difference from FIG. 13A lies in that M stages of fifth scanning units GOA4 that are sequentially connected, M stages of sixth scanning units GOA5 that are sequentially connected, N third selection circuits 81, and N fourth selection circuits 82 are added in this embodiment on a basis of FIG. 13A. In this way, the scanning drive circuit 30 in this embodiment may be applied to a pixel circuit 21 having more pixel transistors, for example, may be applied to a pixel circuit 21 including nine pixel transistors.

A connection relationship between the M stages of fifth scanning units GOA4 and a connection relationship between the M stages of sixth scanning units GOA5 are the same as a connection relationship between the M stages of first scanning units EOA. As shown in FIG. 27, each stage of first scanning unit EOA may respectively transmit a selection signal EM (1), EM (2), EM (3), or EM (4) to each row of pixel circuit. Each stage of second scanning unit GOA1 may respectively transmit a selection signal G1 (1), G1 (2), G1 (3), or G1 (4) to each row of pixel circuit. Each stage of third scanning unit GOA2 may respectively transmit a selection signal G2 (1), G2 (2), G2 (3), or G2 (4) to each row of pixel circuit. Each stage of fourth scanning unit GOA3 may respectively transmit a selection signal G3 (1), G3 (2), G3 (3), or G3 (4) to each row of pixel circuit. Each stage of fifth scanning unit GOA4 may respectively transmit a selection signal G4 (1), G4 (2), G4 (3), or G4 (4) to each row of pixel circuit. Each stage of sixth scanning unit GOA5 may respectively transmit a selection signal G5 (1), G5 (2), G5 (3), and G5 (4) to each row of pixel circuit.

A structure of the third selection circuit 81 and a structure of the fourth selection circuit 82 are also the same as a structure of the first selection circuit 60. As shown in FIG.

27, first input ends of the N first selection circuits 60 are respectively connected to a second stage of first scanning unit EOA to an $M^{th}$ stage of first scanning unit EOA, second input ends of the N first selection circuits 60 are respectively connected to output ends of a first stage of fourth scanning unit GOA3 to an $(M-1)^{th}$ stage of fourth scanning unit GOA3, and output ends of the N first selection circuits 60 are respectively connected to input ends of a second stage of fourth scanning unit GOA3 to an $M^{th}$ stage of fourth scanning unit GOA3.

As shown in FIG. 27, first input ends of the N second selection circuits 70 are respectively connected to a second stage of fourth scanning unit GOA3 to an $M^{th}$ stage of fourth scanning unit GOA3, second input ends of the N second selection circuits 70 are respectively connected to output ends of a first stage of second scanning unit GOA1 to an $(M-1)^{th}$ stage of second scanning unit GOA1, and output ends of the N second selection circuits 70 are respectively connected to input ends of a second stage of second scanning unit GOAL to an $M^{th}$ stage of second scanning unit GOA1.

As shown in FIG. 27, first input ends of the N third selection circuits 81 are respectively connected to a second stage of fifth scanning unit GOA4 to an $M^{th}$ stage of fifth scanning unit GOA4, second input ends of the N third selection circuits 81 are respectively connected to output ends of a first stage of sixth scanning unit GOA5 to an $(M-1)^{th}$ stage of sixth scanning unit GOA5, and output ends of the N third selection circuits 81 are respectively connected to input ends of a second stage of sixth scanning unit GOA5 to an $M^{th}$ stage of sixth scanning unit GOA5.

As shown in FIG. 27, first input ends of the N fourth selection circuits 82 are respectively connected to a second stage of third scanning unit GOA2 to an $M^{th}$ stage of third scanning unit GOA2, second input ends of the N fourth selection circuits 82 are respectively connected to output ends of a first stage of fifth scanning unit GOA4 to an $(M-1)^{th}$ stage of fifth scanning unit GOA4, and output ends of the N fourth selection circuits 82 are respectively connected to input ends of a second stage of fifth scanning unit GOA4 to an $M^{th}$ stage of fifth scanning unit GOA4.

The foregoing describes embodiments of this disclosure with reference to the accompanying drawings. However, this disclosure is not limited to the foregoing specific implementations. The foregoing specific implementations are merely examples instead of limitations. Inspired by this disclosure, a person of ordinary skill in the art may further make modifications without departing from the purposes of this disclosure and the protection scope of the claims, and all the modifications shall fall within the protection of this disclosure.

What is claimed is:

1. A scanning drive circuit, comprising:

multiple stages of first scanners that are sequentially connected, wherein each stage of the first scanners comprises a first output end;

multiple stages of second scanners that are sequentially connected, wherein each stage of the second scanners comprises a first input end and a second output end; and at least one first selection circuit, comprising:

a second input end connected to the first output end of any stage of the first scanners;

a third input end connected to the second output end of an $(m-1)^{th}$ stage of the second scanners; and a third output end connected to the first input end of an $m^{th}$ stage of the second scanners, wherein the first selection circuit is configured to:

receive a first selection signal from any stage of the first scanners;

receive a second selection signal from the $(m-1)^{th}$ stage of the second scanners; and transmit the first selection signal or the second selection signal to the $m^{th}$ stage of the second scanners, or no signal is transmitted between the first selection circuit and the $m^{th}$ stage of the second scanners.

2. The scanning drive circuit of claim 1, wherein the first selection circuit further comprises:

a first switching transistor comprising:

a first electrode;

a second electrode used as the third input end; and a first control electrode;

a second switching transistor comprising:

a third electrode used as the second input end;

a fourth electrode connected to the first electrode and used as the third output end; and a second control electrode;

a first drive signal input end connected to the first control electrode; and a second drive signal input end connected to the second control electrode.

3. The scanning drive circuit of claim 1, wherein the second input end is connected to a first output end of an $m^{th}$ or an (m−1)th stage of the first scanners.

4. The scanning drive circuit of claim 1, wherein the at least one first selection circuit comprises N first selection circuits, wherein the multiple stages of first scanners comprises M stages, wherein the multiple stages of second scanners comprises M stages, wherein M is an integer greater than 1, N is an integer greater than or equal to 1, and M−N=1, wherein the second input ends of the N first selection circuits are respectively correspondingly connected to a first stage of the second scanners to an $(M-1)^{th}$ stage of the second scanners, wherein the third input ends of the N first selection circuits are further respectively correspondingly connected to the first stage of the second scanners to the $(M-1)^{th}$ stage of the second scanners, and wherein the third output ends of the N first selection circuits are further respectively correspondingly connected to a second stage of the second scanners to an $M^{th}$ stage of the second scanners.

5. The scanning drive circuit of claim 1, wherein the at least one first selection circuit comprises N first selection circuits, wherein the multiple stages of first scanners comprises M stages, wherein the multiple stages of second scanners comprises M stages, wherein M is an integer greater than 1, N is an integer greater than or equal to 1, and M−N>1, wherein the second input ends of the N first selection circuits are respectively correspondingly connected to $N^{th}$ stages of the first scanners, wherein the third input ends of the N first selection circuits are further respectively correspondingly connected to $N^{th}$ stages of the second scanners, and wherein the third output ends of the N first selection circuits are further respectively correspondingly connected to the $N^{th}$ stages of the second scanners.

6. The scanning drive circuit of claim 5, further comprising:

a third drive signal input end; and a third switching transistor comprising:

a fifth electrode connected to the second output end of the $m^{th}$ stage of the second scanners;

a sixth electrode connected to the first input end of an $(m+1)^{th}$ stage of the second scanners; and a third control electrode connected to the third drive signal input end, wherein the second output end of the $m^{th}$ stage of the second scanners is not connected to the first selection circuit.

7. The scanning drive circuit of claim 6, comprising:

K third switching transistors, wherein a difference between M and K+N is 1, and wherein the second output ends of a first stage of the second scanners to an $(M-1)^{th}$ stage of second scanners are connected to the third switching transistor or the first selection circuit.

8. The scanning drive circuit of claim 1, further comprising a column start signal input end connected to the first input end of first stage of the second scanners.

9. The scanning drive circuit of claim 1, further comprising:

a fourth drive signal input end; and a fourth switching transistor comprising:

a seventh electrode connected to the first output end of any stage of the first scanners;

a eighth electrode connected to the first input end of a first stage of the second scanners; and a fourth control electrode connected to the fourth drive signal input end.

10. The scanning drive circuit of claim 9, wherein the seventh electrode is connected to the first output end of a first stage of the first scanners.

11. The scanning drive circuit of claim 1, further comprising a fifth switching transistor comprising:

a tenth electrode connected to the second input end;

a ninth electrode connected to the first output end of a $p^{th}$ stage of the first scanners; and a fifth control electrode connected to the first output end of a $(p+q)^{th}$ stage of the first scanners, wherein both p and q are integers greater than or equal to 1.

12. The scanning drive circuit of claim 11, wherein $p=m-1$ and $q=1$.

13. The scanning drive circuit of claim 12, wherein there are a plurality of the fifth switching transistors, the number of the fifth switching transistors is the same as the number of the first selection circuits, and a tenth electrode of each fifth switching transistor is correspondingly connected to the second input end of each first selection circuit.

14. The scanning drive circuit of claim 1, further comprising:

multiple stages of third scanners that are sequentially connected, wherein each stage of the third scanners comprises a fourth input end and a fourth output end; and at least one second selection circuit comprising:

a fifth input end connected to the second output end of any stage of the second scanners;

a sixth input end connected to the fourth output end of an $(m-1)^{th}$ stage of the third scanners; and a fifth output end connected to the fourth input end of an $m^{th}$ stage of the third scanners.

15. The scanning drive circuit of claim 1, further comprising:

multiple stages of fourth scanners that are sequentially connected, wherein each stage of the fourth scanners comprises a sixth output end;

multiple stages of fifth scanners that are sequentially connected, wherein each stage of the fifth scanners comprises a seventh input end and a seventh output end; and at least one third selection circuit comprising:

an eighth input end connected to the sixth output end of any stage of the fourth scanners;

a ninth input end connected to the seventh output end of an $(m-1)^{th}$ stage of the fifth scanners; and an eighth output end connected to the seventh input end of an $m^{th}$ fourth stage of the fifth scanners.

16. A display, comprising:

a plurality of pixel circuits arranged in an array; and a scanning drive circuit electrically connected to the plurality of pixel circuits and comprising:

multiple stages of first scanners that are sequentially connected, wherein each stage of the first scanners comprises a first output end;

multiple stages of second scanners that are sequentially connected, wherein each stage of the second scanners comprises a first input end and a second output end; and at least one first selection circuit, comprising:

a second input end connected to the first output end of any stage of the first scanners;

a third input end connected to the second output end of an $(m-1)^{th}$ stage of the second scanners; and a third output end connected to the first input end of an $m^{th}$ stage of the second scanners, wherein the first selection circuit is configured to:

receive a first selection signal from any stage of the first scanners;

receive a second selection signal from the $(m-1)^{th}$ stage of the second scanners; and transmit the first selection signal or the second selection signal to the $m^{th}$ stage of the second scanners, or no signal is transmitted between the first selection circuit and the $m^{th}$ stage of the second scanners.

17. The display of claim 16, further comprising a displaying drive circuit, wherein the scanning drive circuit further comprises a drive signal input end connected to the displaying drive circuit, and wherein the displaying drive circuit is configured to send a low-level signal to the drive signal input end.

18. The display of claim 17, wherein the displaying drive circuit is further configured to:

send a first clock signal to the scanning drive circuit when the second output ends output a low-level signal; or send a second clock signal to the scanning drive circuit when the second output ends output a high-level signal, wherein a first frequency of the first clock signal is less than a second frequency of the second clock signal.

19. The display of claim 17, wherein the displaying drive circuit is further configured to send a clock signal to the scanning drive circuit when the second output ends output a low-level signal, wherein the clock signal is a direct current signal.

20. An electronic device, comprising:

a display comprising:

a plurality of pixel circuits arranged in an array; and a scanning drive circuit electrically connected to the plurality of pixel circuits and comprising:

multiple stages of first scanners that are sequentially connected, wherein each stage of the first scanners comprises a first output end;

multiple stages of second scanners that are sequentially connected, wherein each stage of the second scanners comprises a first input end and a second output end; and at least one first selection circuit, comprising:

a second input end connected to the first output end of any stage of the first scanners;

a third input end connected to the second output end of an $(m-1)^{th}$ stage of the second scanners; and a third output end connected to the first input end of an $m^{th}$ stage of the second scanners, wherein the first selection circuit is configured to:

receive a first selection signal from any stage of the first scanners;

receive a second selection signal from the $(m-1)^{th}$ stage of the second scanners; and transmit the first selection signal or the second selection signal to the $m^{th}$ stage of the second scanners, or no signal is transmitted between the first selection circuit and the $m^{th}$ stage of the second scanners; and a controller electrically connected to the display and configured to transmit video data, a clock signal, and additional signaling to the display.

* * * * *